(12) United States Patent
Kauppinen et al.

(10) Patent No.: US 8,845,995 B2
(45) Date of Patent: Sep. 30, 2014

(54) SINGLE, MULTI-WALLED, FUNCTIONALIZED AND DOPED CARBON NANOTUBES AND COMPOSITES THEREOF

(75) Inventors: Esko Kauppinen, Helsinki (FI); David P. Brown, Helsinki (FI); Albert G. Nasibulin, Espoo (FI); Hua Jiang, Espoo (FI); Anna Moisala, Espoo (FI)

(73) Assignee: Canatu Oy, Vasterskog (FI)

( * ) Notice: Subject to any disclaimer, the term of this patent is extended or adjusted under 35 U.S.C. 154(b) by 1526 days.

(21) Appl. No.: 10/591,954

(22) PCT Filed: Mar. 9, 2005

(86) PCT No.: PCT/FI2005/000145
§ 371 (c)(1),
(2), (4) Date: Sep. 8, 2006

(87) PCT Pub. No.: WO2005/085130
PCT Pub. Date: Sep. 15, 2005

(65) Prior Publication Data
US 2007/0148962 A1   Jun. 28, 2007

(30) Foreign Application Priority Data
Mar. 9, 2004   (FI) .................... 20040365

(51) Int. Cl.
*D01F 9/127* (2006.01)
*B01J 19/08* (2006.01)
(Continued)

(52) U.S. Cl.
CPC ........... *H01M 4/583* (2013.01); *C01P 2004/13* (2013.01); *B82Y 30/00* (2013.01); *C01B 31/0233* (2013.01); *H01M 4/96* (2013.01); *C01B 2202/02* (2013.01); *C01B 2202/06* (2013.01); *Y02E 60/50* (2013.01); *C01P 2004/04* (2013.01); *C01P 2004/133* (2013.01); *C01B 31/0273* (2013.01); *Y02E 60/12* (2013.01); *B82Y 40/00* (2013.01); *Y10S 977/843* (2013.01)
USPC .......... 423/447.3; 422/186; 977/843

(58) Field of Classification Search
USPC ............. 423/447.1, 447.2, 447.3, 445 B; 977/742–754, 848; 422/186; 438/637; 638/689
See application file for complete search history.

(56) References Cited

U.S. PATENT DOCUMENTS 6,426,134 B1 *   7/2002   Lavin et al. ............... 428/300.1
6,448,709 B1     9/2002   Chuang et al.
(Continued)

FOREIGN PATENT DOCUMENTS

FI      20035120      7/2003
JP      2004044064 A  2/2004
(Continued)

OTHER PUBLICATIONS

Kamalakaran, Synthesis of thick and crystalline nanotube arrays by spray pyrolysis, Applied Physics Letters 2000; 77(21): 3385-3387.*

(Continued)

*Primary Examiner* — Daniel C McCracken
(74) *Attorney, Agent, or Firm* — Young & Thompson

(57) ABSTRACT

The present invention relates to single walled and multi-walled carbon nanotubes (CNTs), functionalized CNTs and carbon nanotube composites with controlled properties, to a method for aerosol synthesis of single walled and multi-walled carbon nanotubes, functionalized CNTs and carbon nanotube composites with controlled properties from pre-made catalyst particles and a carbon source in the presence of reagents and additives, to functional, matrix and composite materials composed thereof and structures and devices fabricated from the same in continuous or batch CNT reactors. The present invention allows all or part of the processes of synthesis of CNTs, their purification, doping, functionalization, coating, mixing and deposition to be combined in one continuous procedure and in which the catalyst synthesis, the CNT synthesis, and their functionalization, doping, coating, mixing and deposition can be separately controlled.

23 Claims, 15 Drawing Sheets

(51) Int. Cl.
*B82Y 30/00* (2011.01)
*C01B 31/02* (2006.01)
*H01M 4/96* (2006.01)
*H01M 4/583* (2010.01)
*B82Y 40/00* (2011.01)

(56) References Cited

U.S. PATENT DOCUMENTS

| | | | |
|---|---|---|---|
| 6,599,961 B1 * | 7/2003 | Pienkowski et al. | 523/120 |
| 6,692,717 B1 | 2/2004 | Smalley et al. | |
| 2002/0102193 A1 | 8/2002 | Smalley et al. | |
| 2002/0102203 A1 | 8/2002 | Smalley et al. | |
| 2004/0265211 A1 * | 12/2004 | Dillon et al. | 423/447.3 |

FOREIGN PATENT DOCUMENTS

| | | | |
|---|---|---|---|
| WO | WO 00/26138 | 5/2000 | |
| WO | 02060813 A2 | 8/2002 | |
| WO | WO 02/076887 * | 10/2002 | C01B 31/02 |
| WO | WO 02/095097 | 11/2002 | |
| WO | 03008331 A1 | 1/2003 | |
| WO | WO 03/056078 * | 7/2003 | D01F 9/12 |
| WO | 2004007362 A1 | 1/2004 | |

OTHER PUBLICATIONS

Zhang, et al., Rapid growth of well-aligned carbon nanotube arrays, Chemcial Physics Letters 2002; 362: 285-290.*
Sato, et al., Growth of diameter-controlled carbon nanotubes using monodisperse nickel nanoparticles obtained with a differential mobility analyzer, Chemical Physics Letters 2003; 382: 361-366.*
Maruyama, et al., Low-temperature synthesis of high-purity single-walled carbon nanotubes from alcohol, Chemical Physics Letters 2002; 360: 229-334.*
Thostenson, Advances in the science and technology of carbon nanotubes and their composites: a review, Composite Science and Technology 2001; 61: 1899-1912.*
Vivekchand, et al., Carbon nanotubes by nebulized spray pyrolysis, Chemical Physics Letters 2004; 386: 313-318.*
Bandyopadhyaya, et al., Stabilization of Individual Carbon Nanotubes in Aqueous Solutions, Nano Letters 2002; 2(1): 25-28.*
Nasibulin, et al., A novel aerosol method for single walled carbon nanotube synthesis, Chemcial Physics Letters 2005; 402: 227-232.*
Glerup, Marianna et al.; "Synthesis of Multi-walled Carbon Nanotubes and Nano-fibres Using the Aerosol Method with Metal-ions as the Catalyst Precursors," Chemical Physics Letters, 2003, vol. 377, pp. 293-298.*
Nasibulin, et al. Carbon nanotubes and onions from carbon monoxide using Ni(acac)2 and Cu(acac)2 as catalyst precursors, Carbon 2003; 41: 2711-2724.*
Nasibulin, et al., Copper and copper oxide nanoparticle formation by chemical vapor nucleation from copper (II) acetylacetonate, Journal of Nanoparticle Research 2001; 3: 385-400.*
Maruyama, et al., Low-temperature synthesis of high-purity single-walled carbon nanotubes from alcohol, Chemical Physics Letters 2002; 360: 229-234.*
Nasibulin A G et al: "A novel aerosol method for single walled carbon nanotube synthesis" Chemical Physics Letters, North-Holland, Amsterdam, NL, vol. 402, No. 1-3, Jan. 24, 2005, pp. 227-232, XP004702435 ISSN: 0009-2614 the whole document.

Moisala A et al: "The Role of Metal Nanoparticles in the Catalytic Production of Single-Walled Carbon Nanotubes—A Review" Journal of Physics: Condensed Matter, Bristol, GB, vol. 15, No. 42, 2003, pp. S3011-S3035, XP001193822 "Aerosol synthesis of single-walled carbon nanotubes".
Nasibulin A G et al: "Carbon nanotubes and onions from carbon monoxide using Ni(acac)2 and Cu(acac) 2 as catalyst precursors" Carbon, vol. 41, No. 14, 2003, pp. 2711-2724, XP004464998 ISSN: 0008-6223 the whole document.
Bladh et al., "On the iron-catalysed growth of single-walled carbon nanotubes and encapsulated metal particles in the gas phase," *Applied Physics A: Materials Science & Processing*, vol. 70, 2000, pp. 317-322.
Dai et al., "Single-wall nanotubes produced by metal-catalyzed disproportionation of carbon monoxide," *Chemical Physics Letters*, vol. 260, Sep. 27, 1996, pp. 471-475.
Govindaraj et al., "Carbon Structures Obtained by the Disporportionation of Carbon Monoxide over Nickel Catalysts," *Materials Research Bulletin*, vol. 33, No. 4, 1998, pp. 663-667.
Guo et al., "Catalytic growth of single-walled nanotubes by laser vaporization," *Chemical Physics Letters*. vol. 243, 49-54, Sep. 8, 1995.
Hafner et al., "Catalytic growth of single-wall carbon nanotubes from metal particles," *Chemical Physics Letters*, vol. 296, Oct. 30, 1998, pp. 195-202.
Iijima, "Letters to Nature: Helical microtubules of graphitic carbon," *Nature*, vol. 354, Nov. 7, 1991.
Jiao et al., "Single-walled tubes and encapsulated nanoparticles: comparison of structural properties of carbon nanoclusters prepared by three different methods," *Journal of Physics and Chemistry of Solids*, vol. 61, 2001, pp. 1055-1067.
Jung et al., "Growth of carbon nanotubes by chemical vapor deposition," *Diamond and Related Materials*, vol. 10, 2001, pp. 1235-1240.
Moisala et al., "The role of metal nanoparticles in the catalytic production of single-walled carbon nanotubes—a review," *Journal of Physics: Condensed Matter*, vol. 15, 2003, pp. S3011-S3035.
Nasibulin et al., "Nanoparticle Formation via Copper (II) Acetylacetonate Vapor Decomposition in the Presence of Hydrogen and Water," *Journal of Physical Chemistry B: Materials*, vol. 105, 2001, pp. 11067-11075.
Nasibulin et al., "TEM imaging of mass-selected polymer molecules," *Journal of Nanoparticles Research* vol. 4, 2002, pp. 449-453.
Nasibulin et al., "Carbon nanotubes and onions from carbon monoxide using Ni(acac)$_2$ and Cu(acac)$_2$ as catalyuyst precursors," *Carbon*, vol. 41, 2003, pp. 2711-2724.
Nasibulin et al., "A novel aerosol method for single walled carbon nanotube synthesis," Chemical Physics Letters 402 (2005) 227-232.
Shyu et al., "The effects of pre-treatment and catalyst composition on growth of carbon nanofibers at low temperature," *Diamond and Related Materials*, vol. 10, 2001, pp. 1241-1245.
Vander Wal, Randall L. et al.; "Comparative Flame and Furnace Synthesis of Single-walled Carbon Nanotubes," Chemical Physics Letters, May 9, 2001, vol. 336, pp. 24-32.
Japanese Office Action, dated Jul. 13, 2011, in Application No. 2007-502357.
Jiang et al: "Nano Letters: A Selective Alternative of Gold Nanoparticles to Nitrogen-Doped Carbon Nanotubes", 2000 American Chemical Society, vol. 3, No. 3, pp. 275-277.

* cited by examiner

SINGLE, MULTI-WALLED, FUNCTIONALIZED AND DOPED CARBON NANOTUBES AND COMPOSITES THEREOF

1. BACKGROUND OF THE INVENTION

1. Field of the Invention

The present invention relates to single walled and multi-walled carbon nanotubes (CNTs), functionalized carbon nanotubes and carbon nanotube composites with controlled properties, to a method for aerosol synthesis of single walled and multi-walled carbon nanotubes, functionalized carbon nanotubes and carbon nanotube composites with controlled properties from pre-made catalyst particles and a carbon source in the presence of reagents and additives, to functional, matrix and composite materials composed thereof and structures and devices fabricated from the same in continuous or batch CNT reactors.

2. Description of Related Art

Carbon nanotubes are of great interest since they exhibit unique and useful chemical and physical properties related to, for instance, their morphology, toughness, electrical and thermal conductivity and magnetic properties. Since their discovery, CNTs have been the subject of intensive research and numerous patents, scientific articles and books have been devoted to their synthesis, properties and applications. Nanotubes were first observed during a direct-current arc discharge between graphite electrodes in an argon environment by Iijima (Nature 1991, 354, 56). The typical temperatures for carbon nanotube production by that method are about 2000-3000° C. Since then, various authors described alternative means of carbon nanotubes production, which allowed increased production rate and significantly decreased temperatures, e.g., [Jiao and Seraphin, *J. Phys. & Chem. Solids* 2000, 61, 1055; Hafner et al., *Chem. Phys. Lett.* 1998, 296, 195]. For instance, it has been shown that the presence of transition metals decreases the typical temperature required for tube production (e.g., Jung et al., *Diamond and Related Materials* 2001, 10, 1235; Govindaraj et al., *Materials Research Bulletin* 1998, 33, 663; Shyu and Hong, *Diamond and Related Materials* 2001, 10, 1241). Since their discovery, several different production methods have been introduced to synthesize CNTs. These methods can be broadly divided into chemical and physical according to the method applied in releasing carbon atoms from carbon-containing precursor molecules. In the physical methods, e.g. arc-discharge (Iijima, *Nature* 1991, 354, 56) and laser ablation (Guo et al., *Chem. Phys. Lett.* 1995, 243 49), high-energy input is used to release the carbon atoms needed for tube synthesis. The chemical methods rely on carbon atomization via catalytic decomposition of carbon precursors on the surface of transition metal particles. According to the place where the growth of CNTs occur, chemical methods for their production can be divided into surface supported, so called CVD (chemical vapor deposition) [e.g. Dai et al., *Chem. Phys. Lett.* 1996, 260, 471] and aerosol [e.g. Bladh, Falk, and Rohmund, *Appl. Phys. A,* 2000, 70 317; Nasibulin et al., *Carbon,* 2003, 41, 2711] syntheses. In CVD methods, the carbon precursor decomposition and CNT formation take place on the surface of catalyst particles that are supported on a substrate. In aerosol synthesis, the catalyst particles are in the gas-phase. The terms "gas-phase synthesis" and "floating catalyst method" have been also applied in the literature for this process. We use the term "aerosol synthesis" to specify processes taking place completely in the gas-phase.

The method described in this patent is a new approach to the production of single walled and multi-walled CNTs, functionalized CNTs and CNT composite materials and matrices thereof. This new method requires pre-made catalyst particles or a procedure to produce pre-made catalyst particles with a narrow distribution of properties, a carbon source, a reagent, when needed, an energy source, when needed and a flow control system. A principle advantage of the new method over existing methods is that it allows the separate control of the introduction of catalyst particles and the CNT synthesis. In other methods, catalyst particles are formed by gaseous chemical reactions leading to the formation of supersaturated vapor of the catalyst material (e.g. WO 00/26138) or physical nucleation directly from supersaturated gas (e.g. WO 03/056078) simultaneously with the CNT synthesis and thus cannot be separately controlled. This leads to the formation of CNTs with potentially large variation in important properties such as length, diameter and chirality. The diameter and chirality of the CNTs produced via catalysts are largely determined by the properties of the catalyst particles, in particular the catalyst size. Though patent US 2002/102193 A describes a means of separately producing catalyst particles and CNTs, it does not specify a means of controlling the high non-uniformity of catalyst particles produced by the chemical nucleation method proposed and thus will tend to produce non-uniform CNTs. Our invention, on the other hand, provides a means of separately introducing catalyst particles with well controlled properties, either directly though a process which inherently produces catalysts with narrow particle size distributions (e.g. the physical vapor nucleation processes described in this method), or by providing specific means of narrowing the size distribution from processes (such as the chemical nucleation method referred to in US 2002/102193 A) which inherently produce wide catalyst particle size distributions and thus non-uniform CNTs. As the industrial and scientific utility of produced CNTs is a function of their individual and collective properties, there exists an urgent need for CNTs and a method for production of CNTs and CNT composite formulations with more uniform and controlled properties.

In our method we utilize pre-made particles for production of CNTs and CNT composite formulations. Those pre-made particles can be prepared by conventional methods such as chemical vapor decomposition of catalyst precursor [e.g. Nasibulin et al., *J. Phys. Chem. B,* 2001, 105, 11067.], by the physical vapor nucleation method, which implies an evaporation and subsequent vapor nucleation followed by growth of particles due to vapor condensation and cluster coagulation (for instance, a resistively heated hot wire generator, an adiabatic expansion in a nozzle or an arc discharge method), by thermal decomposition of precursor solution droplets (e.g. by electrospray thermal decomposition) or by any available method which either inherently produces particles with a narrow distribution of properties or can be pre-classified prior to CNT synthesis to narrow the distribution. The pre-made particles are then introduced into a CNT reactor where CNT synthesis takes place. Thus, the current invention separates the catalyst production from the CNT synthesis and allows the control of each step in the production process. In order to produce CNTs with further controlled properties, the pre-made particles, either produced as part of the process or introduced from existing sources, can be classified according to size, mobility, morphology or other properties before being introduced into one or more CNT reactors. Furthermore, the current invention allows the continuous or batch production of composite CNT either coated or mixed with additive materials. Additionally, the current invention provides a means of producing pure, functionalized or composite CNT gas, liquid or solid dispersions, solid structures, powders, pastes, colloidal suspensions and surface depositions and can be integrated directly into a means of fabricating structures from such materials. Additionally, when used in conjunction with the physical nucleation method, the current invention provides the additional advantage of allowing better control over conditions in the CNT reactor conditions since physical nucleation introduces no additional chemical compounds into the environment which can interfere with CNT formation, growth, purification and/or functionalization.

2. SUMMARY OF THE INVENTION

The present invention relates to single walled and multi-walled carbon nanotubes (CNTs), functionalized carbon nanotubes and carbon nanotube composites with controlled properties, to a method for aerosol synthesis of single walled and multi-walled carbon nanotubes, functionalized carbon nanotubes and carbon nanotube composites with controlled properties from pre-made catalyst particles and a carbon source in the presence of zero or more reagents and zero or more additives, to functional, matrix and composite materials composed thereof and structures and devices fabricated from the same in one or more continuous or batch CNT reactors. This method comprises the steps of:
  (a) formation of catalyst particles (so-called pre-made particles), if needed;
  (b) size classification of the pre-made catalyst particles, if needed;
  (c) introducing the pre-made catalyst particles into the CNT reactor;
  (d) introducing one or more carbon sources into the CNT reactor;
  (e) catalytic decomposition of one or more carbon sources;
  (f) formation of CNTs;
  (g) introducing zero or more reagents, which can be done together with carbon sources or separately before, during or after the CNT formation, to promote CNT formation, to purify CNTs, to dope CNTs, and/or to functionalize the produced CNTs when desired;
  (h) introducing zero or more additives to the CNT aerosol to produce a CNT composite material when desired;
  (i) collection of produced CNTs and/or CNT formulations in a solid, liquid or gas dispersion, a solid structure, a powder, a paste, a colloidal suspension and/or as a surface deposition when desired;
  (j) deposition of gas dispersions of produced CNTs and/or composite CNT formulations onto surfaces and/or into matrix and/or layered structures and/or devices when desired.

The present invention includes one or more CNT reactors, which can allow continuous or batch production of CNTs, functionalized CNTs, doped CNTs and composites thereof. The present invention allows all or part of the processes of synthesis of CNTs, their purification, doping, functionalization, coating, mixing and deposition to be combined in one continuous procedure and in which the catalyst synthesis, the CNT synthesis, and their functionalization, doping, coating, mixing and deposition can be separately controlled. The present invention further provides a composition of matter comprising single walled and multi-walled CNTs and structures and devices fabricated from the same.

3. BRIEF DESCRIPTION OF DRAWINGS

4. DETAILED DESCRIPTION OF THE INVENTION

The present invention relates to single walled and multi-walled carbon nanotubes (CNTs), functionalized carbon nanotubes and carbon nanotube composites with controlled properties, to a method for aerosol synthesis of single walled and multi-walled carbon nanotubes, functionalized carbon nanotubes and carbon nanotube composites with controlled properties from pre-made catalyst particles and a carbon source in the presence of zero or more reagents and zero or more additives, to functional, matrix and composite materials composed thereof and structures and devices fabricated from the same in one or more continuous or batch CNT reactors. Once the CNTs are formed, they can be purified, further functionalized and/or doped and/or further coated with additional materials by, for instance, condensation of supersaturated gas on the CNT surface or by being mixed with an additional aerosol source, thus creating composite CNTs.

Figure 1:
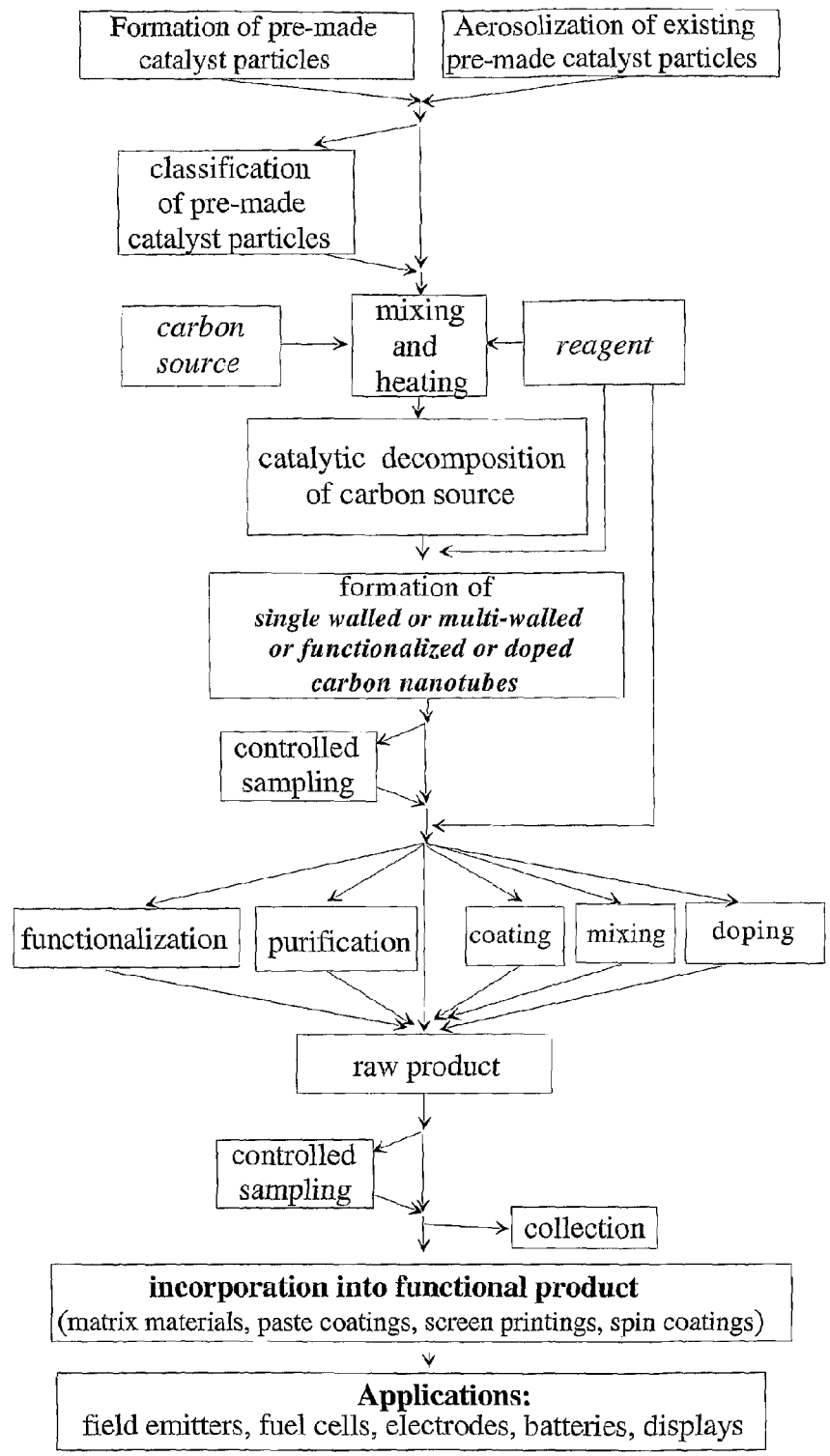
FIG. 1 shows a block diagram of an arrangement for the method for CNT production.

FIG. 1 shows a block diagram of an arrangement of the invention for single walled and multi-walled CNT production. The method can be a continuous flow, batch or a combination of batch and continuous sub-processes. The first step of the method is to obtain aerosolized pre-made catalyst particles. These particles can be produced as part of the process or can come from an existing source. Those particles can be classified according to important properties (for instance, size, mass, shape, crystalinity, charge or mobility) or, when the distribution of properties is sufficiently narrow, can be directly introduced into the CNT reactor. In the CNT reactor, the pre-made catalyst particles are mixed and heated together with one or more carbon sources and with zero or more reagents. Then, the carbon source catalytically decomposes. Reagents can be added into the CNT reactor for chemical reaction with catalyst particles and/or carbon source and/or with CNTs. Thus, reagents can be added together with one or more carbon sources, after the decomposition of the carbon source, and/or after the CNT formation. During or after the formation of CNTs, the entire product or some sampled portion of the product can be selected for further processing steps such as functionalization, purification, doping, coating and mixing. All or a sampled part of the resulting raw CNT product can then be collected directly, or incorporated into a functional product material which can further be incorporated in devices.

Carbon Sources

According to the present invention, as a carbon source, various carbon containing precursors can be used. Carbon sources include, but are not limited to, gaseous carbon compounds such as methane, ethane, propane, ethylene, acetylene as well as liquid volatile carbon sources as benzene, toluene, xylenes, trimethylbenzenes, methanol, ethanol, and/or octanol. Alternatively and preferably, carbon monoxide gas alone or in the presence of hydrogen can be used as a carbon source. Other carbon sources are possible and these examples are not intended to limit the scope of the invention in any way.

Figure 2:
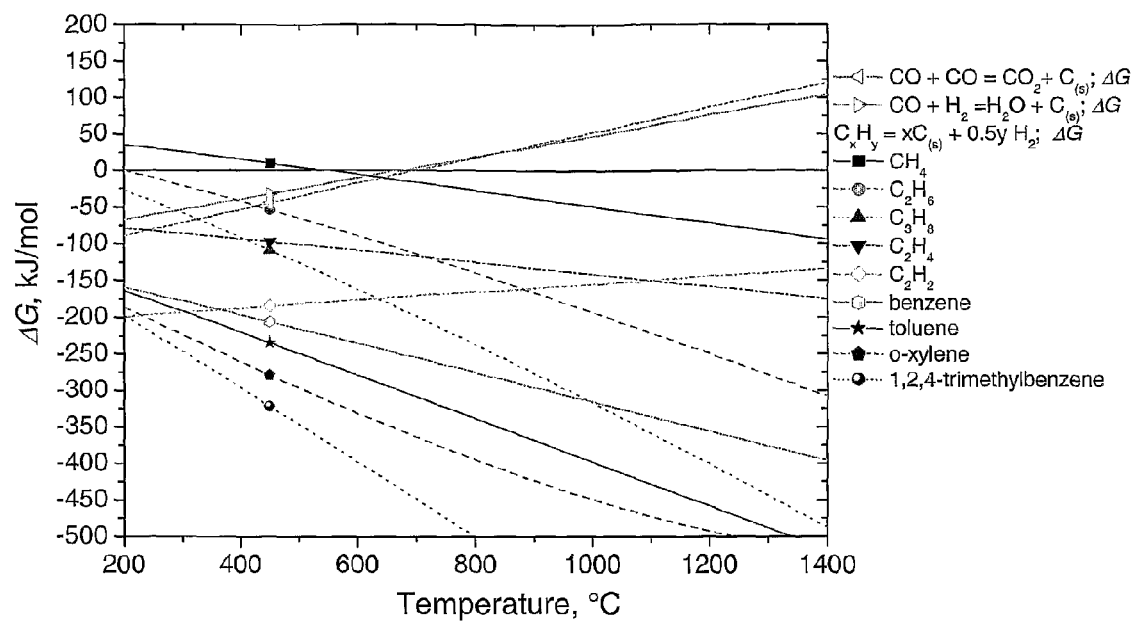
FIG. 2 shows thermodynamic calculations of free Gibbs' energy of decompositions of example carbon sources at different temperatures.

Thermodynamic calculations for decompositions of various carbon sources are presented in FIG. 2. This figure is provided to illustrate the variety of possible desirable carbon sources and does not, in anyway, limit the sources for which the present method can be applied. Note that increasing the temperature in the system generally makes the potential carbon sources less stable, except for the reactions connected with carbon monoxide: CO disproportionation and the reaction between CO and $H_2$. Those reactions will be discussed further as related to the description of the preferred embodiment and in Example 1.

For other carbon sources, increasing the number of atoms in saturated hydrocarbons ($CH_4$, $C_2H_6$, $C_3H_8$) generally leads to a decrease in the stability of the substances. The stability behavior of systems with saturated carbon bonds from $C_2H_2$ via $C_2H_4$ to $C_2H_6$ is more complex, because of its complex temperature dependency. Some liquid carbon sources are also included in this figure. One can see a trend for aromatic compounds (benzene $C_6H_6$, toluene $C_6H_5$—$CH_3$, o-xylene $C_6H_4$—$(CH_3)_2$, 1,2,4-trimethylbenzene $C_6H_3$—$(CH_3)_3$). The most stable is the benzene molecule. Increasing the amount of methyl groups in the compound makes compounds less stable. To control the properties of produced CNTs, such as chirality, fullerene molecules can be also used as a carbon source. Nevertheless, all of the presented compounds and many other carbon containing molecules can be used as a carbon source in the present invention. It is worth noting that the decomposition of carbon sources can occur even without the presence of catalyst particles, but because the decomposition is a kinetically limited process, a reasonable decomposition rate at moderate temperatures and relatively low residence times can be obtained in the presence of catalyst particles.

Additionally, other methods can be used to activate carbon precursors at desired locations in the reactors by using, for instance, heated filaments.

Catalyst Particles

As a catalyst material, various transition metals, which catalyze the process of carbon source decomposition/disproportionation known in the art can be used. A preferred catalyst particle consist of transition metals and combinations thereof, but other materials are possible. Generally preferred for CNT production are catalyst based on iron, cobalt, nickel, chromium, molybdenum, palladium. Other metal and non-metal materials are possible according the invention and the preceding examples are not intended to limit the scope of the invention in any way.

The catalyst particles to be introduced into the CNT reactor can be produced by various methods known in the art such as chemical vapor decomposition of catalyst precursor, physical vapor nucleation, or of droplets made by electrospray, ultrasonic atomization, air atomization and the like or thermal drying and decomposition. Other methods for producing catalyst particles are possible according to the invention and the preceding list is in no way intended to limit the processes applicable. Additionally, pre-made catalyst particles can be synthesized in advance and then introduced into the CNT reactor, though, generally, particles of the size range needed for CNT production are difficult to handle and store and thus it is preferable to produce them in the vicinity of the CNT reactor as an integrated step in the CNT and composite CNT production process.

For the chemical method of pre-made catalyst particle production, metalorganic, organometallic or inorganic compounds such as metallocene, carbonyl, and chelate compounds known in the art can be used as catalyst precursors. In general, however, due to the relatively slow decomposition reaction for these precursors, relatively wide particle size distributions are achieved with these methods, thus, to achieve the desired control of catalyst particle sizes, these methods should be used in conjunction with a pre-classifier. Other compounds are possible according to the invention and these examples are in no way intended to limit the compounds available according to the invention.

For the physical method of pre-made catalyst particle production, pure metals or their alloys can be evaporated by using various energy sources such as resistive, conductive or radiative heating or chemical reaction (wherein the concentration of produced catalyst vapor is below the level needed for nucleation at the location of release) and subsequently nucleated, condensed and coagulated from supersaturated vapor. Means of creating supersaturated vapor leading to the formation of catalyst particles in the physical method include gas cooling by convective, conductive and/or radiative heat transfer around, for instance, a resistively heated wire and/or adiabatic expansion in, for instance, a nozzle. The hot wire method developed here, however, is preferable in that it inherently produces catalyst particles with a narrow size distribution and thus does not require a pre-classification step to produce CNTs with a narrow distribution of properties.

For the thermal decomposition method of pre-made catalyst particle production, inorganic salts can be used such as nitrates, carbonates, chlorides, fluorides of various metals. Other materials are possible according to the present invention and these examples are not intended to limit the scope of the invention in any way In order stabilize the CNT production and to enhance the decomposition of carbon precursor at the catalyst particle surface, the reactor walls preferably, but not necessary, should be saturated by the catalyst material. The wall saturation can be done by any available methods. As an example, a chemical vapor deposition of the material on walls using a catalyst material compound as a precursor or by evaporation of catalyst material and allowing its condensation on the reactor walls can be done. Another possibility to have saturated conditions is to use a reactor tube made of the catalyst containing material as is demonstrated in Example 3.

For the production of CNTs with further controlled properties, the pre-made particles can be classified according to, for instance, mobility or size and by, for instance, differential mobility analyzers (DMA) or mass spectrometers. Other methods and criteria for classification are possible according to the present invention and the preceding examples are not intended to limit the scope of the invention in any way. Additionally, flow control, with, for instance, sheath gas and isokinetic sampling can be used to, for instance, provide uniform conditions for particle and CNT formation and growth and/or to classify product according to reactor conditions so as to achieve for uniform CNT and composite CNT properties.

Promotion, Purification, Functionalization and Doping of CNTs

Reagents are needed for participation in the chemical reaction with catalyst particle precursor and/or with catalyst particles and/or with carbon source and/or with amorphous carbon and/or with CNTs. The purpose of the reagent is to be a promoter for the CNT formation and/or to increase (or decrease) the rate of carbon source decomposition and/or to react with amorphous carbon during or after the production of CNTs for purification and/or to react with CNTs for functionalization and/or doping of CNTs. The reagents can also behave as a carbon source according the present invention.

As a promoter for CNT formation, preferably sulfur, phosphorus or nitrogen elements or their compounds such as thiophene, $PH_3$, $NH_3$ can be used. Additional promoters include $H_2O$, $CO_2$ and NO. Other promoter compounds known in the art are possible according to the present invention and these examples are not intended to limit the scope of the invention in any way.

Purification processes are generally needed to remove undesirable amorphous carbon coatings and/or catalyst particles encapsulated in CNTs. Usually this procedure takes significant time and energy, often more than required for the CNT production itself. In the present invention it is possible to have one or more separated heated CNT reactors/reactor sections, where one CNT reactor or section of the CNT reactor is used to produce CNTs and the other(s) are used for, for instance, purification, functionalization and/or doping. It is also possible to combine the growth and functionalization steps as shown in examples 7 and 8. Amorphous carbon, deposited on the surface of CNTs, can be removed in one or more subsequent CNT reactors/reactor sections by, for instance, heat treatment and/or addition of special compounds which, for instance, form reactive radicals (for instance, OH), which react with undesirable products rather then with CNTs. One or more subsequent CNT reactors/sections can be used for, for instance, the removal of catalyst particles from the CNTs by creating the conditions where the catalyst particles evaporate as was shown in [Nasibulin et al., *Carbon* 2003, 412, 2711 and FI-20035120]. Other processing steps are possible according to the present invention.

As a reagent for the reaction with a carbon source to alter its decomposition rate, hydrogen can be used. As an example, carbon monoxide reacts with hydrogen, namely, with hydrogen atoms, which are formed at high temperatures due to decomposition of hydrogen molecules.

As a chemical for amorphous carbon removal, any compounds or their derivatives or their decomposition products formed in situ in the CNT reactor, which preferably react with amorphous carbon rather then with graphitized carbon, can be used. As an example of such reagents known in the art, alcohols, ketones, organic and inorganic acids can be used. Additionally, oxidizing agents such at $H_2O$, $CO_2$ or NO can be used. Other reagents are possible according to the present invention and these examples are not intended to limit the scope of the invention in any way.

Another role of the reagent is to functionalize the CNTs. Chemical groups attached to CNTs alter the properties of the produced CNTs. Functionalization and doping of CNTs can radically change such properties as solubility and electronic structure (varying from wide band gap via zero-gap semiconductors to CNTs with metallic properties). As an example, the doping of CNTs by lithium, sodium, or potassium elements leads to the change of the conductivity of CNTs, namely, to obtain CNTs possessing superconductive properties. Functionalization of CNTs with fullerenes produces semi-conducting CNTs and allows further functionalization of the CNTs via the attached fullerenes by methods known in the art. In the current invention, the in-situ functionalization and/or doping can be achieved via the introduction of appropriate reagent before, during or after CNT formation.

Moreover, the reagent, which can be used for promotion, purification, functionalization, and/or doping of CNTs can be a carbon source as well. Also a carbon source, which can be used for the CNT production, can also be a reagent.

CNT Composites by Coating and Mixing

One or more additives can be used for coating and/or mixing with the produced CNTs to create composite CNT formulations. The purpose of the additives are to, for instance, increase the catalytic efficiency of particles deposited in a matrix or to control matrix properties of such as hardness, stiffness and thermal and electrical conductivity or expansion coefficient. As a coating or particle additive for CNT composite materials, preferably one or more metal containing or organic materials such as polymers or ceramics can be used. Other additive compounds are possible according to the present invention and these examples are not intended to limit the scope of the invention in any way. These can be deposited as a surface coating on the CNTs through, for instance, condensation of supersaturated vapor, chemical reaction with previously deposited layers, doping agents or functional groups or by other means known in the art or, in the case that the additive is a particle, mixed and agglomerated in the gas phase. Additionally, gas and particle deposition on CNTs can be combined.

Classification

In order to produce CNTs with further controlled properties, pre-made particles, either produced as part of the process or introduced from existing sources, can be classified according to size, mobility, morphology or other properties before being introduced into the CNT reactor(s), where the CNT formation occurs. For instance, a high resolution differential mobility analyzer (HR-DMA) [Nasibulin et al., *J. Nanoparticle Res.* 2002, 4, 449], which allows a very high resolution particle size selection a with standard deviation of $\sigma \leq 1.025$ at 1 nm particle size, can be used as a classifier. Other examples include, but are not limited to, mass spectroscopy, sedimentation, diffusion, centrifugation, salvation, and chemical reaction according to the invention. Additionally, controlling the flow field and temperature distribution in the reactor can be used as a means to control and/or classify catalyst particle properties.

Energy Sources

Various energy sources can be used, when desired, to promote or impede, for instance, chemical reactions and CNT synthesis according to the invention. Examples include, but are not limited to, resistively, conductively, radiatively or nuclear or chemical reactively heated CNT reactors and/or pre-reactors.

Controlled Sampling and Deposition of Aerosol Product

Various means can be used, when desired, to control or selectively sample the CNT and composite CNT before and/or after functionalization, purification, coating, mixing and/or doping. Such control devices reduce the variation of product properties by selecting only those products that have been exposed to similar environmental conditions. Various means of controlled sampling of the aerosol product are possible according to the invention, including, but not limited to, selective sampling from regions of the reactor with uniform conditions and aerosol focusing through particle lenses, acoustic focusing devices, and electrical focusing fields. Similarly, these techniques can be combined by those experienced in the art to further enhance their control effects.

Controlled deposition of synthesized materials can be achieved by various means including, but not limited to inertial impaction, thermophoresis and/or migration in an electrical field to form desired geometries (e.g. lines, dots or films) with desired properties such as electrical or thermal conductivity, opacity or mechanical strength, hardness or ductility.

A method for producing single and multi-walled Carbon Nanotubes (CNT)s and composite CNTs from the gas phase comprising one or more CNT reactors; one or more sources supplying energy to said CNT reactor(s); one or more sources of pre-made aerosol catalyst particles introduced to said CNT reactor(s) wherein the catalyst particles are produced by physical vapor nucleation of catalyst material or by solution droplet thermal decomposition of catalyst precursor or are aerosolized from a powder or suspension or wherein the catalyst particles are produced by a chemical method and are subsequently pre-classified according to one or more particle properties; one or more carbon sources introduced to said CNT reactor(s).

A method additionally including one or more of: one or more pre-reactors for producing pre-made catalyst particles; one or more catalyst particle classifiers; one or more CNT samplers; one or more CNT classifiers; one or more sources supplying energy to said pre-reactor(s); one or more reagents supplied to said CNT reactor(s)/pre-reactors(s); one or more aerosol samplers and/or classifiers extracting all or part of said CNT aerosol flow; one or more additives to said CNT reactor(s) and/or pre-reactors(s) to produce a composite CNT aerosol; one or more aerosol samplers and/or classifiers extracting all or part of said composite CNT aerosol flow.

A method, wherein the catalyst precursor contains one or more metals.

A method, wherein the catalyst particles are formed due to the nucleation of supersaturated vapor wherein the vapor is evaporation from one or more resistively heated wires consisting of one or more metals or metal alloys, due to metal or alloy laser ablation, due to metal or alloy arc, spark or electrostatic discharge, due to evaporation from a conductively heated metal or alloy or due to evaporation from radiatively heated metal or alloy.

A method, wherein the supersaturation is created by means of gas cooling by convective, conductive and/or radiative heat transfer and/or adiabatic expansion.

A method, wherein the catalyst precursor is a metalorganic, organometallic or inorganic catalyst containing compound.

A method, wherein the pre-made catalyst particles are classified according to one or more particle properties.

A method, wherein the pre-made catalyst particles are mobility-size classified, mass classified, solubility classified, reactivity classified, inertially classified, thermophoretically classified, diffusionally classified, charge classified, crystalinity classified and/or gravitationally classified.

A method, wherein the pre-made catalyst particles are classified by a differential mobility analyzer or by a mass spectrometer.

A method, wherein the carbon source is an organic or inorganic carbon containing compound.

A method, wherein the organic compound is a hydrocarbon.

A method, wherein the hydrocarbon is methane, ethane, propane, acetylene, ethylene, benzene, toluene, o-xylene, p-xylene, 1,2,4-trimethylbenzene, 1,2,3-trimethylbenzene, $C_{15}H_{32}$, $C_{16}H_{34}$, $C_{17}H_{36}$, or $C_{18}H_{38}$.

A method, wherein the organic compound is an oxygen containing compound.

A method, wherein the oxygen containing compound is methanol, ethanol, propanol, butanol, pentanol, hexanol, heptanol, octanol, acetone, methyl ethyl ketone, formic acid or acetic acid.

A method, wherein the inorganic compound is carbon monoxide CO.

A method, wherein the residence time and/or temperature and/or catalyst particle properties and/or catalyst particle concentration and/or reagent concentration and/or carbon source concentration histories in one or more CNT reactors are controlled and the pre-made catalyst particles, carbon sources, reagents and carrier gases are continuously introduced into the CNT reactor which is maintained at steady state conditions and the products are continuously evacuated from the CNT reactor(s) and or pre-reactor(s) to comprise a continuous production of product or the pre-made catalyst particles, carbon sources, reagents and carrier gases are periodically introduced into the CNT reactor in which the conditions are controlled for a period of time and the products are periodically evacuated from the CNT reactor(s) and or pre-reactor(s) to comprise a batch production of product.

A method, wherein the reactor length, volume and/or wall temperature and/or the flow rate of carbon sources and/or reagents and/or carrier gases are used to control the residence time and/or temperature history of catalyst particles and/or CNTs and/or composite CNTs in the CNT reactor(s) and or pre-reactor(s).

A method, wherein said CNT reactor(s) and/or pre-reactor(s) use sheath gas introduced through a porous or perforated wall, a co-flowing channel or an injection port to control the aerosol flow so as to minimize deposition and/or to control the residence time, gaseous environment and/or temperature history of catalyst particles and/or CNTs and/or carbon nanotube composites inside the CNT reactor(s) and or pre-reactor(s).

A method, wherein said CNT aerosol sampler and/or composite CNT sampler selectively extracts a portion of carbon nanotubes and/or carbon nanotube composites from inside the CNT reactor(s).

A method, wherein said sampling is in the form of one or more isokinetic sampling probes or one or more sampling probes combined with one or more particle aerodynamic lenses and/or one or more particle acoustic lenses.

A method, wherein the CNT reactor and/or pre-reactor surfaces contain material included in one or more catalyst particles or where the CNT reactor and/or pre-reactor surfaces are saturated with material included in one or more catalyst particles.

A method, wherein the reagent(s) is/are used for participation in a chemical reaction with one or more catalyst particle precursors and/or with one or more pre-made particles and/or with one or more carbon source and/or with amorphous carbon deposited on CNTs and/or with CNTs.

A method, wherein the chemical reaction of the reagent(s) with catalyst particle precursor and/or with pre-made particles is/are used for promotion of CNT formation and/or where the chemical reaction of the reagent(s) with amorphous carbon is/are used for CNT purification and/or where the chemical reaction of the reagent(s) with the CNTs is/are used for CNT functionalization and/or CNT doping.

A method, wherein one or more reagents act also as a carbon source.

A method, wherein the reagent is an alcohol, $H_2$, $H_2O$, NO, $CO_2$, $PH_3$ and/or $NH_3$.

A method, wherein the energy source is laser, electrical, resistive, conductive, radiative (in the entire range of the electromagnetic spectrum) and/or acoustic heating, combustion or chemical reaction, or nuclear reaction.

A method, wherein the carrier gas and reagent gases entering the pre-reactor(s) are nitrogen and hydrogen and where the volume percent of hydrogen is preferably between 0.1% and 25% and more preferably between 1% and 15% and more preferably between 5% and 10% and most preferably approximately 7% and where there is one pre-reactor operated in series with one CNT reactor that is aligned with gravity and where the pre-reactor uses a hot wire generator to produce pre-made catalyst particles and where the hot wire generator has a wire diameter between 0.01 and 10 mm and more preferably between 0.2 and 0.5 mm and more preferably approximately 0.25 mm and where in the CNT reactor is essentially circular in cross section, oriented approximately vertically with respect to gravity and has an inner diameter preferably between 0.5 and 50 cm and more preferably between 1.5 and 3 cm and most preferably approximately 2.2 cm and a length preferably between 5 and 500 cm and more preferably between 25 and 200 cm and most preferably approximately 90 cm and where the CNT reactor wall is heated resistively.

A method, wherein the hot wire generator is separated in space from the CNT reactor and where in the carbon source is CO and where the CO is introduced into the CNT reactor at a normalized volume flow rate of preferably between 5 and 5000 $cm^3$/min and more preferably between 250 and 800 $cm^3$/min and most preferably at approximately 400 $cm^3$/min and where the maximum CNT reactor wall temperature is between 600 and 15000 degrees C. and more preferably between 850 and 5000 degrees C. and most preferably at approximately 1200 degrees C. and where in the flow rate through the pre-reactor is between 5 and 5000 $cm^3$/min and more preferably between 250 and 600 $cm^3$/min and most preferably at approximately 400 $cm^3$/min and where the secondary and tertiary reagents are thiophene and octanol and where the thiophene vapor pressure is most preferably between 1 and 1000 Pa and more preferably between 10 and 100 Pa and more preferably between 20 and 40 Pa and most preferably approximately 30 Pa and where the octanol vapor pressure is most preferably between 0.1 and 100 Pa and more preferably between 1 and 10 Pa and more preferably between 2 and 4 Pa and most preferably approximately 3.4 Pa.

A method, wherein the pre-reactor is essentially circular in cross section, is smoothly integrated with the CNT reactor by inserted it therein and aligning said pre-reactor with the centerline of said CNT reactor and where the hot wire generator is located essentially at the exit of the pre-reactor and where the end of the smoothly integrated pre-reactor is preferably located where the CNT reactor wall temperature is between 0 and 5000 degrees C. and more preferably between 350 and 450 degrees C. and most preferably approximately 400 degrees C. and where the inner diameter of the pre-reactor is preferrably between 0.1 and 5 cm and more preferably between 0.5 and 1.5 cm and most preferably approximately 0.9 cm and where the outer diameter of the pre-reactor is preferably between 0.2 and 10 cm and more preferably between 0.5 and 2.0 cm and most preferably approximately 1.3 cm and where the maximum CNT reactor wall temperature is between 600 and 15000 degrees C. and more preferably between 850 and 1500 degrees C.

A method, wherein the carbon source is CO and wherein the CO is introduced into the CNT reactor around the pre-reactor at a normalized volume flow rate of preferably between 5 and 5000 $cm^3$/min and more preferably between 250 and 800 $cm^3$/min.

A method, wherein the inner flow rate through the pre-reactor is between 5 and 5000 $cm^3$/min and more preferably between 250 and 600 $cm^3$/min and most preferably at approximately 400 $cm^3$/min.

A method, wherein the CNT reactor walls are constructed from stainless steel.

A method, wherein the carbon source and a second reagent is ethanol and wherein the ethanol vapor pressure is preferably between 1 and 10000 Pa and more preferably between 100 and 500 Pa and most preferably between 150 and 300 Pa and most preferably approximately 213 Pa.

A method, wherein the carbon sources and secondary and tertiary reagents are ethanol and thiophene and where the thiophene vapor pressure is most preferably between 0.01 and 1000 Pa and more preferably between 0.1 and 30 Pa and more preferably between 0.2 and 15 Pa and where the ethanol vapor is pressure most preferably between 1 and 20000 Pa and more preferably between 10 and 10000 Pa and more preferably between 50 and 5000 Pa.

A method, wherein the reagent for the promotion of CNT growth and functionalization is hydrogen and wherein the volume percent of hydrogen in the hotwire generator is greater than 50% and more preferably greater than 90% and more preferably greater than 99%.

A method, wherein the reagent for the functionalization of carbon nanotubes is water vapor, wherein the water vapor is introduced in the outer CO flow via a saturator and where the concentration of water vapor is between 1 and 10000 ppm and more preferably between 10 ppm and 1000 ppm and more preferably between 100 and 200 ppm and most preferably approximately 150 ppm.

A method, wherein there are two or more existing pre-made catalyst particle supplies which are composed of particles of essentially similar sizes, compositions, concentrations, states and/or morphologies or are composed of two or more distinct sizes, compositions, concentrations, states and/or morphologies.

A method, wherein there are two or more pre-reactors and said pre-reactors are operated in parallel and said parallel pre-reactors are operated at essentially similar conditions and/or with essentially similar materials so as to produce pre-made catalyst particles of essentially similar sizes, compositions, concentrations, states and/or morphologies or said parallel pre-reactors are operated at different conditions and/or with different materials and/or methods so as to produce pre-made catalyst particles of two or more distinct sizes, compositions, concentrations, states and/or morphologies.

A method, wherein said CNT reactors are operated in parallel and said parallel reactors are operated at essentially similar conditions and/or with essentially similar materials so as to produce CNTs with essentially similar length, diameter, morphology and/or chirality or said parallel reactors are operated at different conditions and/or with different materials and/or methods so as to produce CNTs with two or more distinct lengths, diameters, morphologies and/or chiralities.

Carbon nanotubes prepared according to the above method.

Carbon nanotubes, wherein the length, diameter, number of walls, chirality, purity, and/or composition of dopants and/or attached functional groups are controlled.

Functionalized carbon nanotubes, wherein the attached functional groups are fullerenes, CNTs, transition metals, transmission metal oxides, polymers and/or polymer catalysts.

Carbon nanotubes, wherein the geometric standard deviation of the length is less than 2.5 or more preferably less than 1.5 or most preferably less than approximately 1.25 and where in the geometric standard deviation of the diameter is less than 2.5 or more preferably less than 1.75 or most preferably less than approximately 1.4 and where the geometric mean diameter is preferably between 0.4 and 25 nm and more preferably between 0.75 and 5 nm and most preferably between approximately 0.8 and 1.3 nm and where the geometric mean length is preferably between 2 nm and 1 m and more preferably between 10 nm and 1000 nm and more preferably between 25 nm and 100 nm and most preferably between approximately 45 and approximately 55 nm.

Carbon nanotubes, wherein the carbon nanotubes are coated with one or more additive solids or liquids and/or solid or liquid particles to constitute a carbon nanotube composite.

CNT composites, wherein one or more additive is introduced to the CNT reactor in the gas phase as a gas and/or as a liquid or solid aerosol particle and/or wherein one or more additive gases are supersaturated so as to condense onto the CNT and/or wherein one or more additive gases chemically react with the surface of the CNT and/or with another additive, and/or with a functional group and/or with a doping material of the CNT and/or wherein one or more additive aerosol particles are attached to the surface of the CNT to form a liquid, solid or mixed coated CNT or a CNT-additive particle agglomerate or a mixture thereof.

Carbon nanotube composites, wherein the coating material is a metal, a polymer, an organic, a ceramic or a mixture thereof.

Carbon nanotubes and/or carbon nanotube composites, wherein the carbon nanotubes and/or composite carbon nanotubes are formulated as a dispersion in a gas, a dispersion in a liquid, a dispersion in a solid, a powder, a paste or a colloidal suspension or are deposited on a surface.

A functional material made with above formulation.

A thick or thin film, a line, a wire or a layered structure composed of above functional material.

A thin or thick film, a line, a wire or a structure deposited by electrical, acoustic, thermophoretic, inertial, diffusional, turbophoretic and/or gravitational forces.

A thin or thick film, a line, a wire or a structure, wherein the deposition is enhanced by jet focusing.

A thin or thick film, a line, a wire or a structure, wherein the coating material is composed of one or more monomers and zero or more catalysts and the resulting functional material is heated so as to induce polymerization.

A device made with any of the above materials.

A device, wherein the device is an electrode of a fuel cell or battery, a heat sink or heat spreader, a metal-matrix composite or polymer-matrix composite in a printed circuit or electron emitter in a field emission display.

5. DETAILED DESCRIPTION OF A PREFERRED EMBODIMENT OF THE INVENTION

Figure 3A:
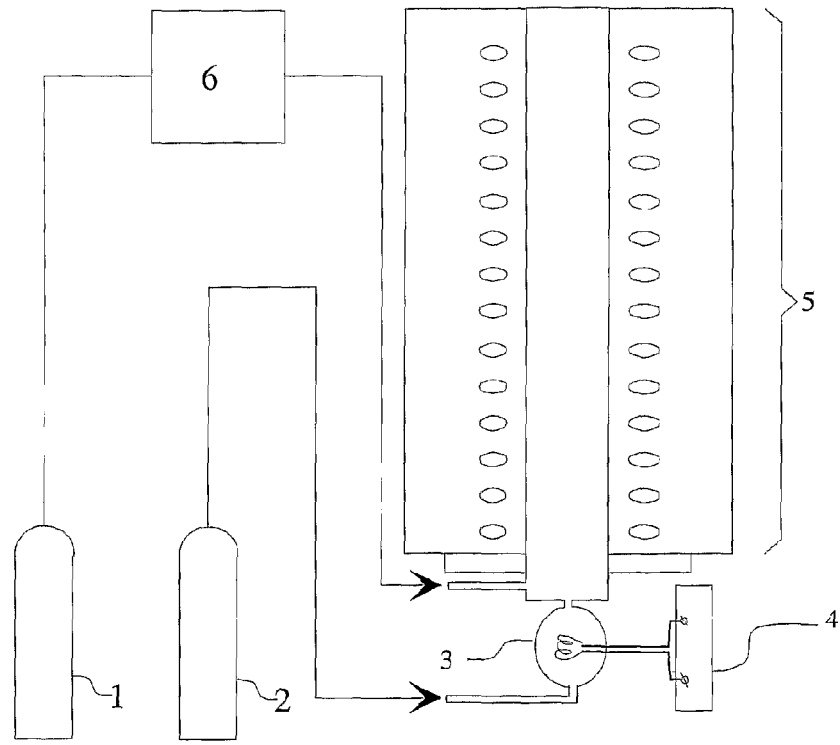
FIG. 3 shows a preferred embodiment of the invention for CNT production where the pre-made catalyst particles were formed by a physical vapor nucleation method from a hot wire generator (a) separated in space from the CNT reactor and (b) smoothly integrated with the CNT reactor.

FIG. 3(a) shows the preferred embodiment of the invention for the continuous production of single walled or multiwalled CNTs where the pre-made catalyst particles are formed by the physical vapor nucleation method from a hot wire generator (HWG) (3) separated in space from the CNT reactor. In said embodiment, a carbon source is supplied either from a carrier gas reservoir (1) (e.g. carbon monoxide, methane, ethane, etc.) or by a carrier gas passing through a saturator (6). The saturator can also be used to introduce reagents for e.g. CNT purification and/or functionalization. If the carbon source is a solid substance, it can be heated to increase the equilibrium vapor pressure. For liquid substances, the saturator can be, for instance, a bubbler. Room temperature is a suitable temperature to provide a suitable vapor pressure for some liquid carbon precursors (for instance, for methanol, ethanol, octanol, benzene, toluene, etc.). Nevertheless, the vapor pressure of the liquid substance can be adjusted by heating or cooling the bubbler or by dilution.

Another carrier gas (pure nitrogen or nitrogen/hydrogen mixture, 93%/7%) is supplied from a carrier gas reservoir (2) to the HWG (3), which is operated with the help of an electric power supply (4). As the carrier gas passes over the heated wire, it is saturated by the wire material vapor. After passing the hot region of the HWG, the vapor becomes supersaturated, which leads to the formation of pre-made particle due to the vapor nucleation and subsequent vapor condensation and cluster coagulation. Inside the CNT reactor (5) or before, when needed, the two separate flows containing the pre-made catalyst particles and the carbon source are mixed and subsequently heated to the CNT reactor temperature. The carbon source can be introduced through the HWG if it does not react with the wire. Other configurations are possible according to the invention, so long as the catalyst particles are formed before CNT synthesis begins.

Figure 3B:
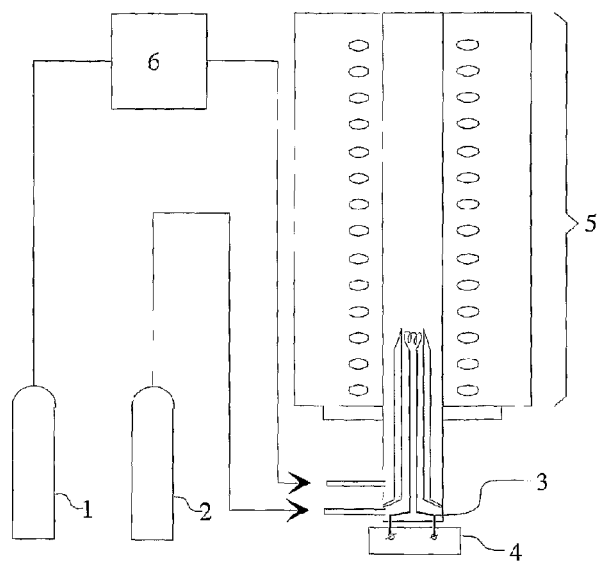

It is known that nanoparticles posses very high diffusivity and high pinning energy with surfaces. In order to avoid diffusion losses of the catalyst particles and to use them more efficiently, the distance between the HWG and the location where the formation of CNT occurs, can be adjusted. FIG. 3(b) shows the equivalent embodiment when the pre-made catalyst particles are formed by a physical vapor nucleation method from a hot wire generator smoothly integrated with the CNT reactor. Here, the HWG is located inside the first section of the CNT reactor. In this preferred embodiment, the end of the HWG tube was placed at the location where the CNT reactor wall temperature of about 400° C. This temperature was found to be optimal, since reduced particle growth due to the catalyst particle agglomeration and coagulation, minimized particle diffusion losses on the walls and provided a reasonable iron vapor nucleation rate.

Figure 4:
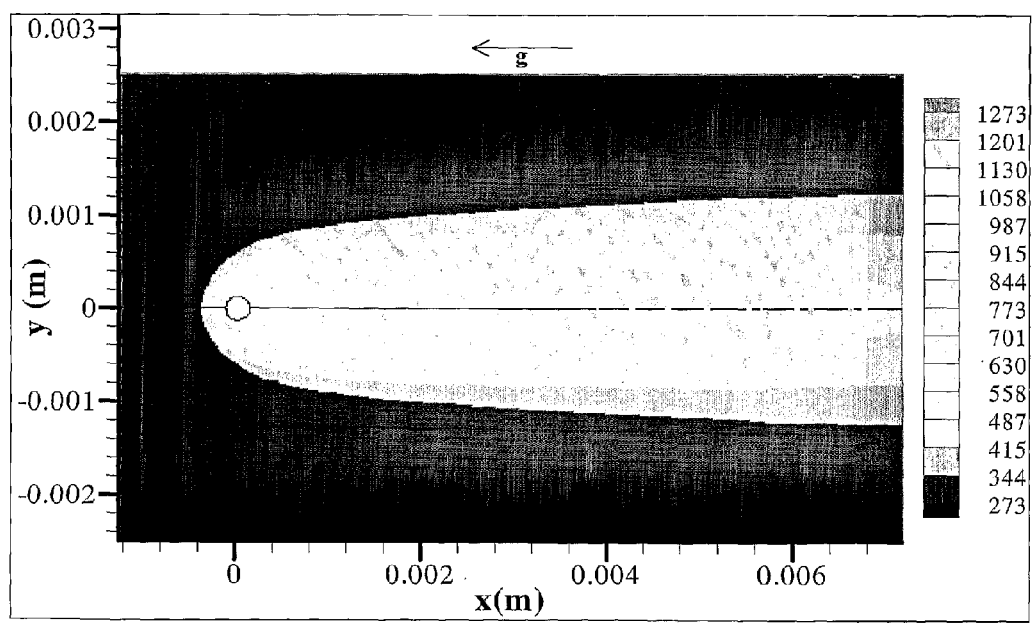
FIG. 4 shows CFD calculations of temperature contours in the vicinity of a resistively heated wire (Inflow velocity U=1 m/s, $T_{gas}$=273 K, $T_{wire}$=1273K. Gravity points to the left).

The metal particle size is of great importance in the formation of CNTs since CNT diameter has been shown to correlate with catalyst particle size. The nucleation rate and final particle size depend on the temperature gradient over the metal wire and on the concentration of the metal vapor. The concentration of the vapor and the temperature gradient on the other hand depend on the gas flow rate over the metal wire and the wire temperature. Since large temperature gradients ($\approx 500000$ K/s) can be achieved, the HWG can be applied to the production of very small primary particles. The temperature change over the heated metal wire was calculated with a Computational Fluid Dynamics (CFD) model. In the calculation, an incoming gas velocity (U) of 1 m/s and temperature of 273 K were used. As can be seen in FIG. 4, the temperature gradient near the wire surface is extremely large meaning that the metal vapor rapidly cools down (approximately 500° C. in 1 mm distance). Correspondingly, the vapor reaches supersaturation very quickly, which in turn results in homogeneous nucleation of large number of small metal clusters. Calculations show that the temperature drops such that homogenous nucleation of catalyst particles should be complete with a few millimeters of the hotwire. Furthermore, it has been found that the method produces exceptionally narrow particle size distributions and so can be used in the current invention without the necessity of a particle classification step as would be needed in, for instance, typical chemical nucleation methods.

Figure 5A:
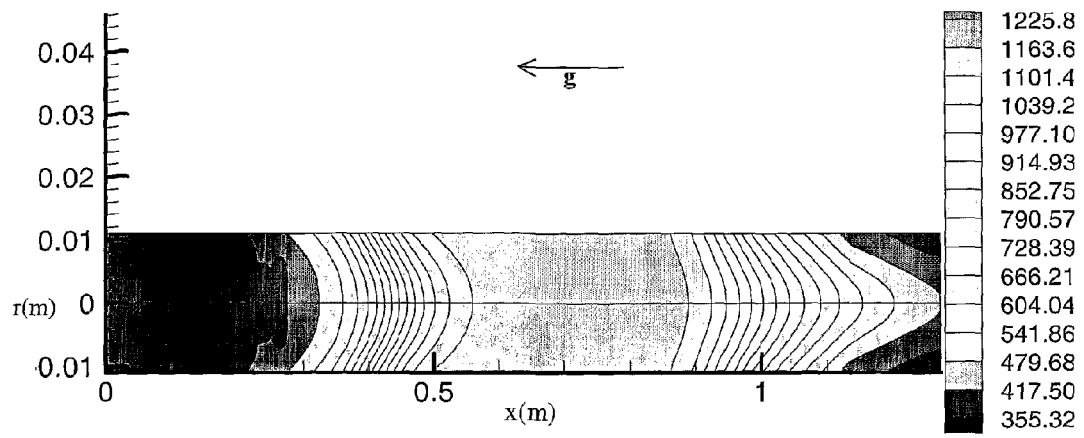
FIG. 5 shows CFD calculations of (a) the temperature profile and (b) velocity vectors in a preferred embodiment of the invention. (Maximum wall $T_{wall}$=1273K, inner flow rate=0.4 LPM, outer flow rate=0.8 LPM. Gravity points to the left).
Figure 5B:
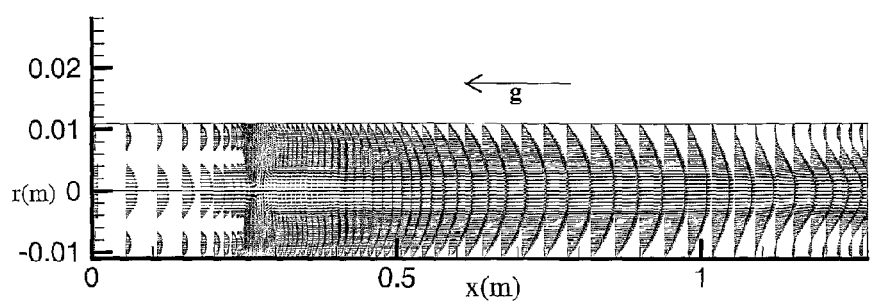

CFD calculations were carried out to define the temperature and velocity profiles and mixing conditions in the CNT reactor (namely, in the preferred embodiment shown in FIG. 3(b)) under laminar conditions including the effects of buoyancy. Results of the CFD calculations are shown in FIG. 5(a) and FIG. 5(b) and exhibit how the current invention can be constructed to define the residence time and temperature history of carrier gases and reagents, catalyst particles and carbon nanotubes in the CNT reactor so as to control catalyst particle and nanotube growth.

6. DESCRIPTION OF SAMPLE ALTERNATE EMBODIMENTS

Figure 6A:
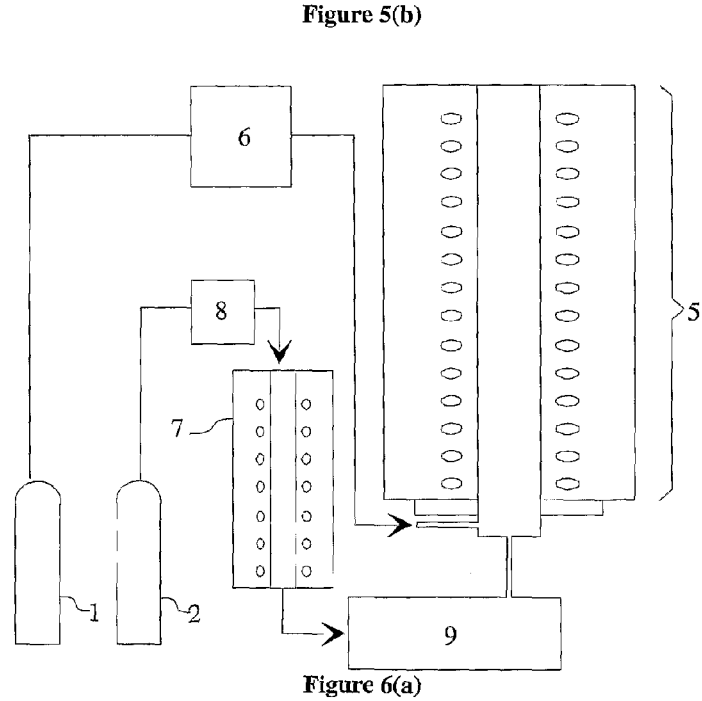
FIG. 6(a) shows an alternate embodiment of the invention for production of single walled and multi-walled CNTs, where the pre-made catalyst particles are formed by decomposing one or more catalyst particle precursors.

FIG. 6(a) shows another embodiment used, according to the present invention, for the production of the single walled and multi-walled CNTs. In this figure, the system for production of pre-made catalyst particles consist of a carrier gas cylinder (2), saturator (8) and (6), a pre-reactor (7) and a particle classifier (9). It should be noted that the carrier gas can be a carbon source as well. The saturator (8) can be used for the carrier gas saturation by a carbon source. The saturator (6) can be used for the carrier gas saturation by a catalyst precursor. Saturators (6) and (8) can also be used to introduce reagents into the system for, for instance, CNT purification or functionalization. If the catalyst precursor and carbon source are solid substances, they can be heated to increase their equilibrium vapor pressures. For liquid substances, the saturator can be, for instance, a bubbler. Room temperature is a suitable temperature for a necessary vapor pressure of some liquid catalyst precursors (for instance, for iron pentacarbonyl) and carbon sources (for instance, benzene and toluene). Nevertheless, the vapor pressure of the liquid substance can be adjusted by heating or cooling the bubbler. Another possibility to decrease the vapor pressure of the liquid after the bubbler is to dilute the liquid with a suitable solvent or to dilute the vapor with an inert gas. For instance, a mixture of benzene and cobalt carbonyl can be used to decrease the vapor pressure of $Co(CO)_4$. Moreover, one or more furnaces or furnace sections can be used. Zero or more furnaces/furnace sections can be used for catalyst production and one or more furnaces/furnace sections can be used for CNT formation. Additional furnaces/furnace sections can be used for purification and/or functionalization and/or doping of CNTs. Zero or more reagents can be added in the system before, during and/or after CNT formation.

The pre-reactor (7) and/or CNT reactor (5) can be, but are not necessarily, resistively heated. Other energy sources can be applied to energize and decompose the precursor. For instance, it can be radio-frequency, microwave, acoustic, laser induction heating or some other energy source such as chemical reaction.

The formed pre-made catalyst particles can be classified in size in a particle classifier (9). For this purpose, a differential mobility analyzer can be used. Other criteria and methods can, according to the invention, be used for classification. Subsequently, the pre-made particles are introduced into the CNT reactor.

Figure 6B:
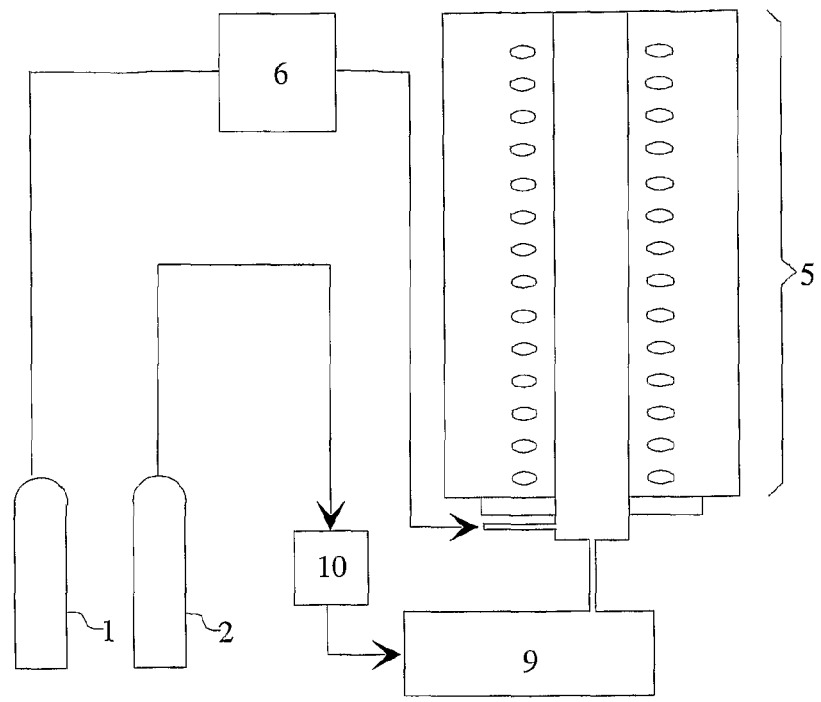
FIG. 6(b) shows an alternate embodiment of the invention for production of single walled and multi-walled CNTs, where the pre-made catalyst particles are formed by a physical vapor nucleation method (for instance, by an arc discharge) or by an electrospray thermal decomposition method.

A sample alternate embodiment of the invention for continuous single walled and multi-walled CNT production where the pre-made catalyst particles are made by the physical vapor nucleation method (for instance, adiabatic expansion in a nozzle or an arc discharge) or by thermal decomposition of precursor solution droplets is shown in FIG. 6(b). All the elements remain the same as in the previous sample alternate embodiment except that, instead of the saturator (8) and the pre-reactor (7) (in FIG. 6(a)), another system for the production of the pre-made particles (10). Box (10) depicts, for example, adiabatic expansion in a nozzle, an arc discharge or electrospray system for the formation of metal containing particles. Other methods are applicable according to the invention and these examples are not intended to limit the scope of the invention in any way. Box (10) can also represent a means of aerosolizing pre-existing catalyst particles. The aerosol pre-made particles can be classified in a classifier (9) or introduced directly to the CNT reactor (5). Methods involving chemical nucleation will, in general, require pre-classification to achieve the desired uniformity in particle properties for well controlled CNT production.

Figure 6C:
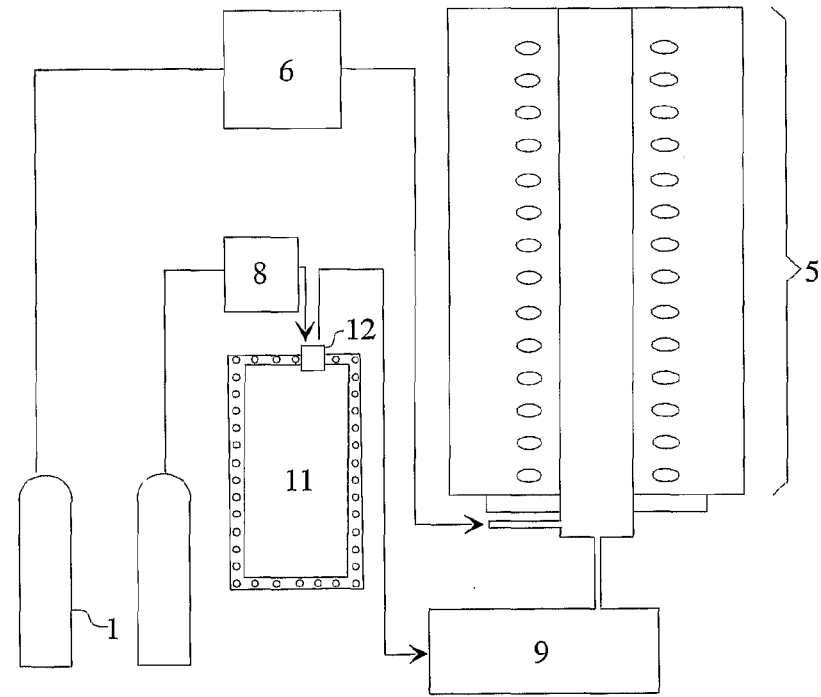
FIG. 6(c) shows an alternate embodiment of the invention for batch production of pre-made catalyst particles in combination with continuous production of single walled and multi-walled CNTs and CNT composites.

A sample alternate embodiment of the invention for batch production of pre-made particles and continuous production of single walled and multi-walled CNT production is shown in FIG. 6(c). As in the continuous processes, the pre-made particles can be prepared by any of the described methods such as physical nucleation, chemical vapor decomposition, or electrospray thermal decomposition in one or more batch CNT reactors (11) by introducing one or more carriers, catalyst precursors, carbon sources and/or reagents through one or more inlet(s)/outlet(s) (12) and subsequently evacuated after the batch process is completed though inlet(s)/outlet(s) (12). Alternately, pre-made catalyst particles can be directly introduced into the CNT reactor(s) or first classified in the classifier (9).

Figure 6D:
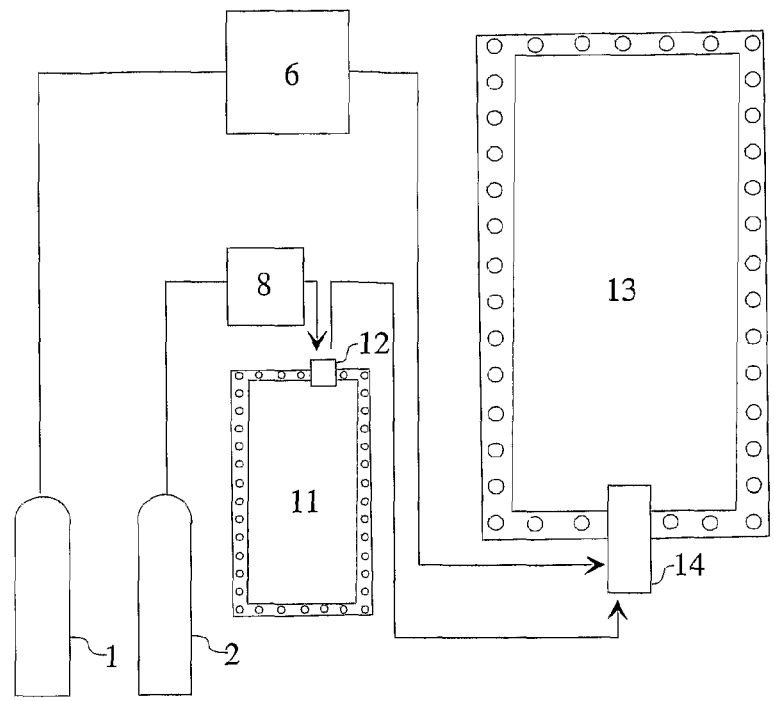
FIG. 6(d) shows an alternate embodiment of the invention for batch production of pre-made catalyst particles in combination batch production of single walled and multi-walled CNTs and CNT composites.

A sample alternate embodiment of the invention for batch production of pre-made particles and batch production of single walled and multi-walled CNT production is shown in FIG. 6(d). As in the continuous processes, the pre-made particles can be prepared by any method such as physical nucleation, chemical vapor decomposition, or electrospray thermal decomposition in one or more batch CNT reactors (11) by introducing one or more carriers, catalyst precursors, carbon sources and/or reagents through one or more inlet(s)/outlet(s) (12) and subsequently evacuated after the batch process is completed though inlet(s)/outlet(s) (12). Alternately, pre-made catalyst particles can be directly introduced into the CNT reactor(s). Once these particles are produced, they can be introduced into the CNT reactor (13) through one or more inlet(s)/outlet(s) (14) where the time, gas composition and temperature history can be adjusted for CNT growth. Subsequently, the CNT reactor can be evacuated though inlet(s)/outlet(s) (14) and the CNTs collected.

Figure 6E:
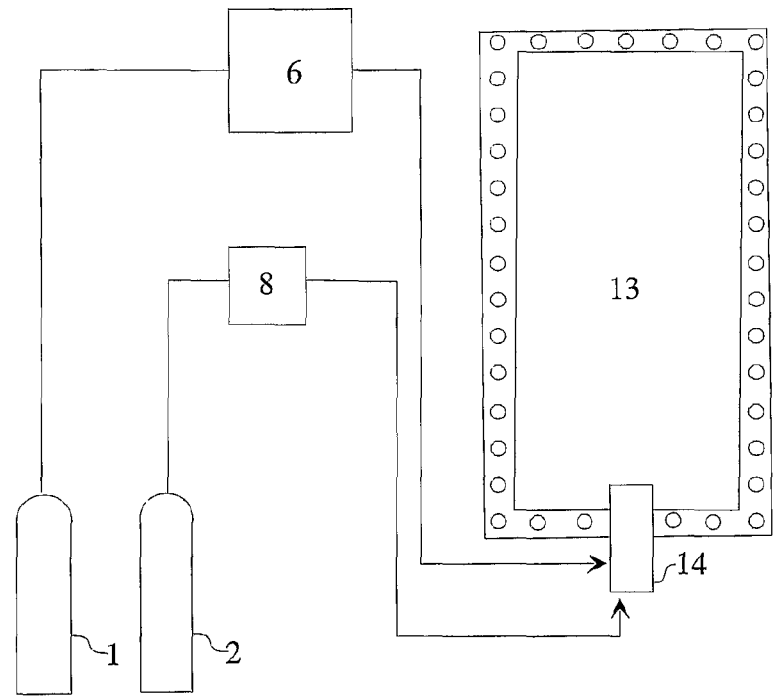
FIG. 6(e) shows an alternate embodiment of the invention for a single batch CNT reactor for production of pre-made catalyst particles and single walled and multi-walled CNTs and CNT composites.

FIG. 6(e) depicts a sample embodiment wherein only one batch CNT reactor is used for both production of pre-made catalyst particles and for CNT synthesis. As in the previous embodiments, the pre-made particles can be prepared by method such as physical nucleation, chemical vapor decomposition, or electrospray thermal decomposition in a batch CNT reactor (13) by introducing precursors, reagents and/or carrier gases through one or more inlet(s)/outlet(s) (14). Alternately, pre-made catalyst particles can be directly introduced into the CNT reactor(s). Once the batch process is complete, appropriate carriers, catalyst precursors, carbon sources and/or reagents are introduced into the CNT reactor (13) through one or more inlet(s)/outlet(s) (14) where the time, gas composition and temperature history can be adjusted for CNT growth. Subsequently, the CNT reactor can be evacuated though inlet(s)/outlet(s) (14) and the CNTs collected.

Figure 6F:
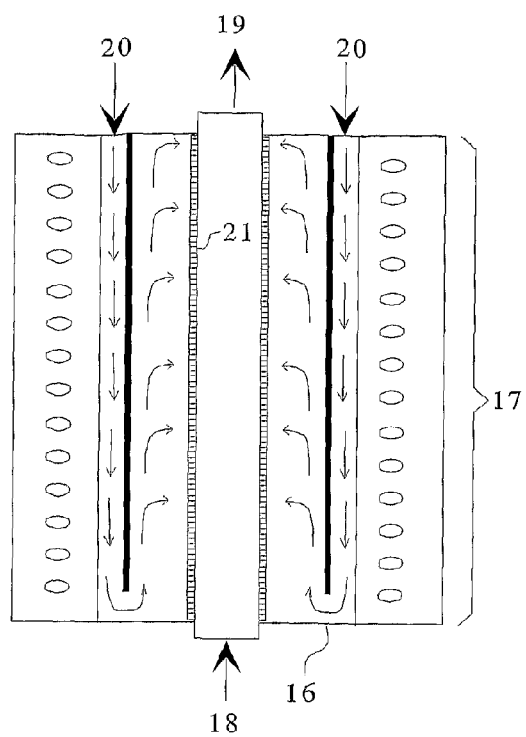
FIG. 6(f) shows an alternate embodiment of the invention for continuous production of CNTs wherein sheath gas is used to insure catalyst particles and CNTs are not deposited on CNT reactor walls, thus avoiding surface growth of CNTs and CNT composites.

FIG. 6(f) depicts a sample embodiment wherein sheath gas is used to control the catalyst particle and CNT deposition and heating in the CNT reactor tube in the case of a continuous flow system. Here a furnace (17) heats one or more carriers, catalyst particles, catalyst precursors, carbon sources and/or reagents introduced through inlet (18). Additional sheath gases are fed to the CNT reactor through one or more porous tubes (21), thus insuring the CNT reactor surfaces are free of catalyst particles and CNTs. Said sheath flow(s) can consist of one or more carriers, catalyst precursors, carbon sources and/or reagents according to the invention. The resulting aerosol then exits the CNT reactor through outlet (19). Other methods of flow control to minimize catalyst particle and CNT deposition are possible according to the invention.

Figure 6G:
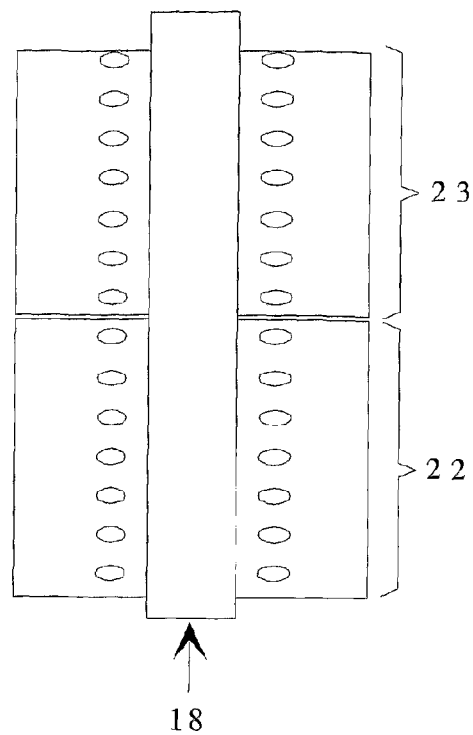
FIG. 6(g) shows an alternate embodiment of the invention for continuous production of CNTs wherein a controlled temperature gradient in the CNT reactor is used to separate catalyst particle synthesis from CNT synthesis.

FIG. 6(g) depicts a sample embodiment wherein a single furnace with a gradually increasing wall temperature is used to separate the catalyst particle production from the CNT formation. In this embodiment, a continuous flow CNT reactor is divided into multiple temperature heating blocks (22) and (23). All required carrier gases, catalyst precursors, carbon sources and/or reagents are introduced though inlet (18). The temperature of heating block (18) is set high enough such that the catalyst particle precursor decomposes to produce catalyst particles by a chemical nucleation method but below that needed to initiate CNT synthesis. The temperature of heating block (22) is set above that needed to initiate CNT synthesis. Each block of the CNT reactor can then be controlled independently thus creating two distinct CNT reactor sections smoothly integrated with one another. Other methods of separating the catalyst particle synthesis and CNT synthesis in a continuous or batch production process are possible according to the invention.

Figure 6H:
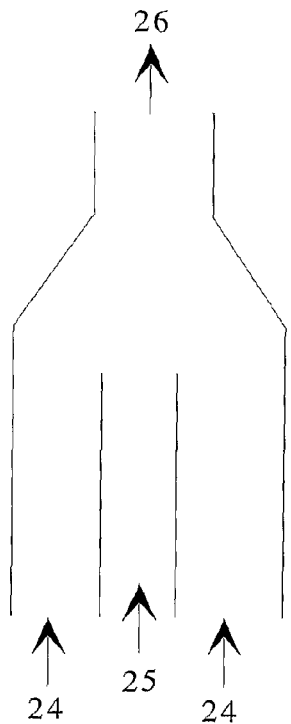
FIG. 6(h) shows an alternate embodiment of the invention for production of composite CNTs wherein an additional flow of coating material or particles is introduced into the CNT aerosol flow and mixed to create a composite formulation.

FIG. 6(h) depicts a sample embodiment of the invention for continuous production of CNT composites wherein an additional flow of additive coating material or aerosolized particles (24) is introduced into the CNT aerosol flow (25) to create a composite material. Examples of possible additives include, but are not limited to, polymers, metals, solvents and ceramics and aerosols thereof. The resulting composite aerosol (26) can then be directly collected, deposited in a matrix or deposited on a surface by electrical, thermophoretic, inertial, diffusional, turbophoretic, gravitational or other forces known to the art to form thick or thin films, lines, structures and/or layered materials. Further control can be achieved by, for instance, jet focusing of the resulting CNT aerosol stream.

Figure 6I:
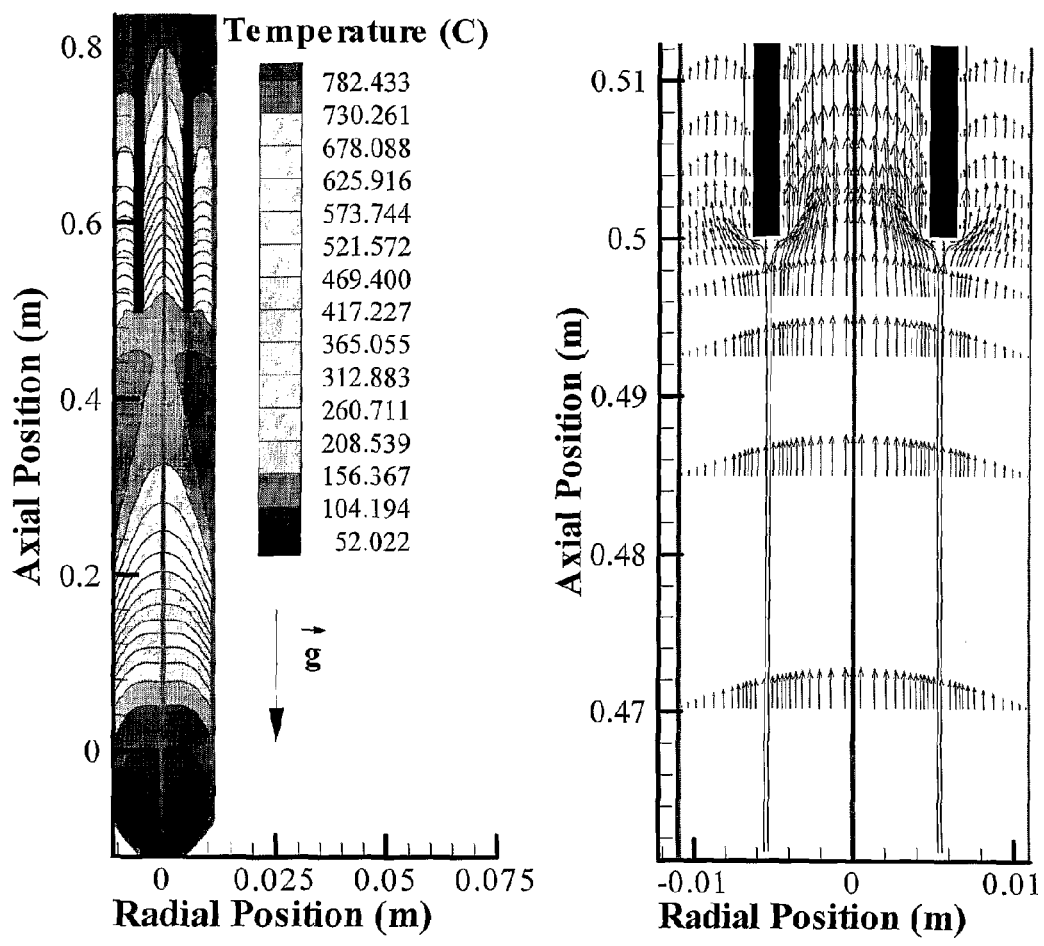
FIG. 6(i) shows a CFD calculation of an alternate embodiment of the invention for production of CNTs and/or CNT composite formulations wherein controlled sampling of the product aerosol is used to isolate a portion of the aerosol flow that has experienced essentially uniform conditions as it has passed through the reactor(s) and/or pre-reactor(s).

FIG. 6(i) shows a CFD calculation of an alternate embodiment of the invention for production of CNTs and/or CNT composite materials wherein controlled sampling of the product aerosol is used to isolate a portion of the aerosol flow that has experienced essentially uniform conditions near the reactor centerline throughout the reactor(s) and/or pre-reactor(s). Other means of controlled sampling of the aerosol product are possible according to the invention, including, but not limited to, aerosol focusing through particle lenses, acoustic focusing devices, and electrical focusing fields.

7. EXAMPLES

In order to facilitate a more complete understanding of the invention, examples are provided below. These examples are for purposes of illustration only and are not intended to limit the scope of the invention in any way.

In all the following examples, the morphology and the size of the product are investigated with a field emission transmission electron microscope (TEM, Philips CM200 FEG) and a field emission scanning electron microscope (Leo Gemini DSM982). Electron diffraction (ED) patterns of the products were used for determination of the crystalline phase of metal particles.

Where various embodiments of the present invention are described in detail, it is apparent that modifications and adaptations of those embodiments will occur to those skilled in the art. However, it is to be expressly understood that such modifications and adaptations are within the spirit and scope of the present invention.

Example 1

Single Walled CNT Synthesis from Carbon Monoxide as Carbon Source Using Iron as Catalyst Material and Using a Ceramic Reactor Tube Carbon source: CO.
Catalyst particle source: hot wire generator.
Catalyst material: iron wire of 0.25 mm in diameter.
Operating furnace temperature: 1200° C.
Operating flow rates: CO outer flow of 400 cm³/min and hydrogen/nitrogen (7/93) inner flow of 400 cm³/min.

This example, illustrating the synthesis of single walled CNTs, was carried out in the embodiment of the invention shown in FIG. 3(b). Carbon monoxide was supplied from a gas cylinder (1) and the experimental setup did not contain a saturator (6). The embodiment consisted of a HWG smoothly integrated with a heated vertical tubular CNT reactor. A ceramic tube, with an internal diameter of 22 mm inserted inside the 90-cm length furnace (Entech, Sweden) was used as a CNT reactor. Inside the CNT reactor another ceramic tube with external and internal diameters of 13 and 9 mm, respectively and with a length of 25 cm was inserted. The HWG, which was a resistively heated thin iron wire, was located inside the internal tube. The location of the internal tube could be adjusted. The end of the HWG tube was placed at the location with the CNT reactor wall temperature of about 400° C. This temperature was found to be optimal, since reduced particle growth due to the agglomeration and coagulation, minimized particle diffusion losses on the walls and provided a reasonable iron vapor nucleation rate.

In order to suppress the iron particle evaporation inside the reactor, the walls of the reactor tube were saturated with iron by running HWG in nitrogen/hydrogen atmosphere without carbon monoxide. Also it is possible to saturate the reactor walls by blowing iron containing compound vapor through the heated up to about 1000° C. reactor. For this purpose, the vapor of ferrocene or iron pentacarbonyl can be used.

Figure 7:
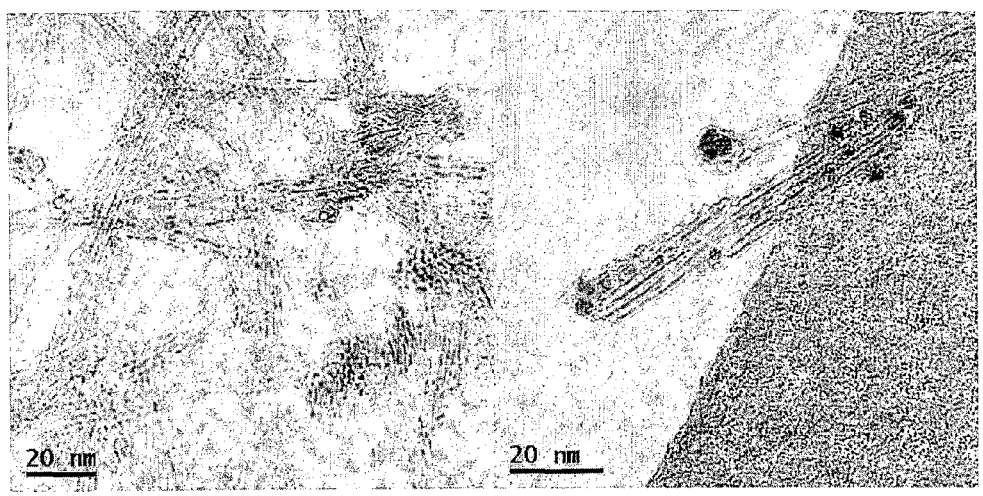
FIG. 7 shows TEM images of single walled CNTs synthesized at 1200° C. from carbon monoxide as a carbon source using iron as a catalyst material.

The metal particles produced by the HWG were carried into the CNT reactor with nitrogen/hydrogen (with mol component ratio of 93.0/7.0) from gas cylinder (2) shown in FIG. 3(b). In the CNT reactor, the flow of the metal particles from the HWG was mixed with the outer CO flow. Inside the CNT reactor CO disproportionation or hydrogenation took place on the surface of the formed metal particles. Downstream of the CNT reactor a porous tube dilutor (12 L/min) was used to prevent the product deposition on the walls. The aerosol product was collected by an electrostatic precipitator (Combination electrostatic precipitator, InTox Products) on a carbon coated copper grid (SPI Lacey Carbon Grid). FIG. 7 demonstrates the product formed at the given operating conditions. CNTs are single walled. The number diameter and length distributions obtained on the basis of high-resolution TEM images are presented in Example 2. An important characteristic of this process is the efficiency of the catalyst material usage. Almost all catalyst particles initiated the growth of CNTs.

Figure 8:
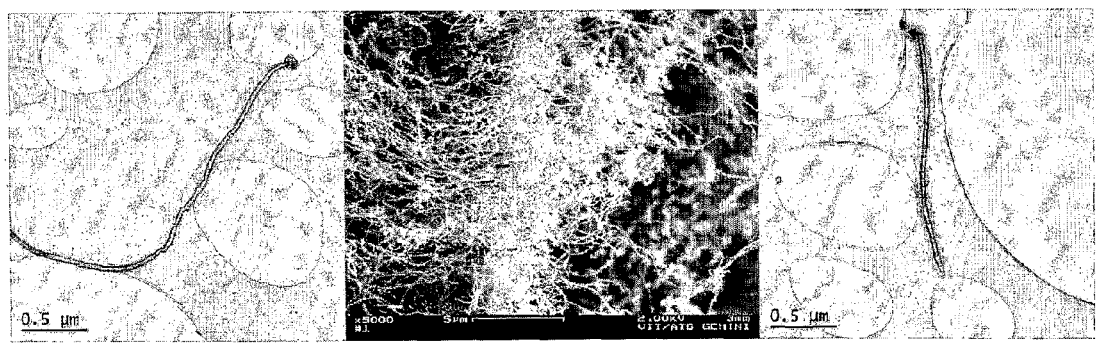
FIG. 8 shows TEM and SEM images of multi-walled CNTs scratched from the CNT reactor walls.

During the experiments also multiwalled CNTs (MWCNTs) were produced on the wall of the CNT reactor. Scratching the product from the walls upstream of the CNT reactor at about 700° C. (after a 10 hour experiment) showed the presence of well crystalline MWCNTs among the product (FIG. 8). The MWCNTs are shown to be a few microns long. TEM observations showed that the product consisted of different types of CNTs: bamboo-shaped tubes, MWCNTs with either a small (about 5) or a large (up to 50) number of walls. Scratching the product from the walls after one week of operation showed very thick carbon tubes of about 200 nm in diameter. Thus, it is demonstrated that CNTs produced in the aerosol phase are markedly different from surface supported (i.e. CVD) produced CNTs.

Thermodynamic Calculations

Figure 9A:
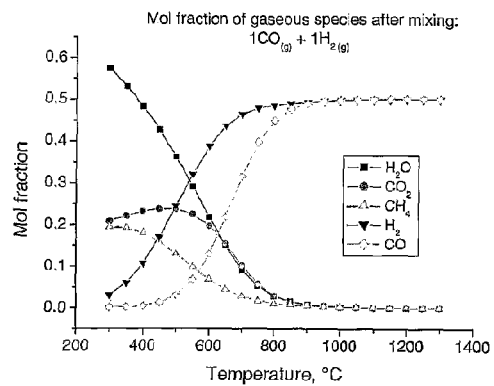
FIG. 9(a) shows thermodynamic calculations of the temperature dependence of mol fraction of the product after mixing 1 mol of CO and 1 mol of $H_2$.

It is well known that at the studied furnace temperatures, two competing reactions, CO disproportionation and hydrogenation, leading to the formation of CNTs can occur. Since there were no CNT produced in the absence of hydrogen, we assume that the hydrogenation reaction of carbon monoxide $$H_{2(g)} + CO_{(g)} \Leftrightarrow C_{(s)} + H_2O_{(g)}, \Delta H = -135 \text{ kJ/mol} \qquad (1)$$

plays a very important role. The justification of the occurrence of this reaction can be seen from the thermodynamic calculations presented in FIG. 9(a). It is worth noting that the concentration of the released carbon after reaction (1) is proportional to the concentration of water. Thus, reaction (I) can occur at temperatures lower than 900° C., while at the temperatures higher than that, the reaction is prohibited. It is necessary to note that this behavior is similar to the reaction of CO disproportionation $$CO_{(g)} + CO_{(g)} \Leftrightarrow C_{(s)} + CO_{2(g)}, \Delta H = -171 \text{ kJ/mol}. \qquad (2)$$

Figure 9B:
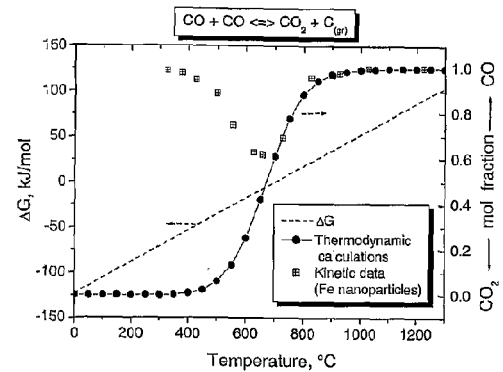
FIG. 9(b) shows thermodynamic data for CO disproportionation: dependencies of free energy change, $\Delta G$, and CO mol fraction in gaseous phase on temperature. Kinetic data: CO concentration after disproportionation on surface of nanometer iron particles.
Figure 9C:
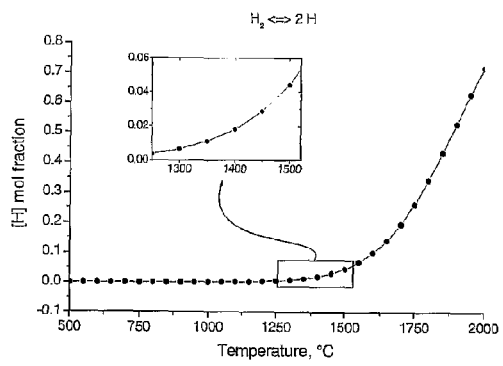
FIG. 9(c) shows thermodynamic calculations of the temperature dependence of the mol fraction of hydrogen atoms.
Figure 9D:
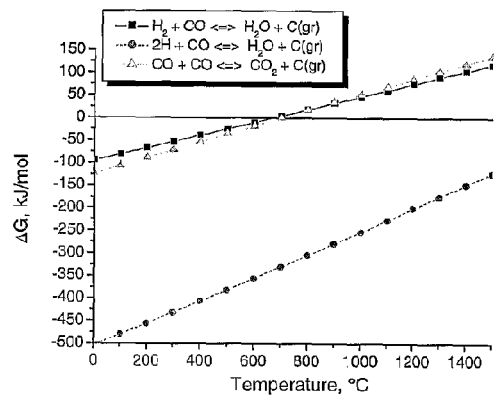
FIG. 9(d) shows thermodynamic temperature dependencies of the free energy change, ΔG, of reaction, leading to the liberation of carbon.

In [Nasibulin et al., Carbon, 2003, 41, 2711], aspects of the occurrence of this reaction was studied. As one can see from and FIG. 9(b), reaction (2) is also inhibited at temperatures higher than about 900° C. and kinetic investigations showed an appreciable reaction rates in the temperature interval from 470 to 800° C. with a maximum rate at the temperature of 670° C. It can be concluded that both reactions (1) and (2) occur in the same temperature range. The hypothesis about the leading role of reaction (1) in the formation of CNTs is supported by the fact that CNTs were produced only in the presence of hydrogen. The importance of hydrogen can be confirmed by the calculations presented in FIG. 9(c) due to hydrogen molecule decomposition at the glowing wire temperatures. In the figure one can see a temperature dependence of equilibrium mol fraction of hydrogen atoms. The amount of hydrogen atoms is significant at the temperatures of the glowing iron wire (approx. 1500° C.). It is known that the formed hydrogen atoms are more reactive than the $H_2$ molecules. Moreover, a reaction between hydrogen atoms and carbon monoxide $$2H_{(g)} + CO_{(g)} \Leftrightarrow C_{(s)} + H_2O_{(g)}, \Delta H = -585 \text{ kJ/mol} \qquad (3)$$

has no temperature limitations at the operated experimental conditions (FIG. 9(d), i.e. this reaction prevails in the high temperature zone, where reactions (1) and (2) are inhibited. Thus, the role of hydrogen in the presented aerosol method can be inferred as preventing the oxidation of the HWG and nanosized catalyst iron particles and also participating in the reaction for the carbon atom release.

Example 2

Number Distributions of Length and Diameters of Single Walled CNTs Produced at Various Conditions and Using a Ceramic Reactor Tube Carbon source: CO.
Catalyst particle source: hot wire generator.
Catalyst material: iron wire of 0.25 mm in diameter.
Operating furnace temperature: 1000, 1200, 1400° C.
Operating flow rates: hydrogen/nitrogen (7/93) inner flow of 400 $cm^3$/min;
CO outer flow: 400, 590, 765 $cm^3$/min.

The example of the CNTs produced at 1200° C. and at equal internal $H_2/N_2$ and external CO flow rates of 400 $cm^3$/min is described and shown in Example 1.

Figure 10A:
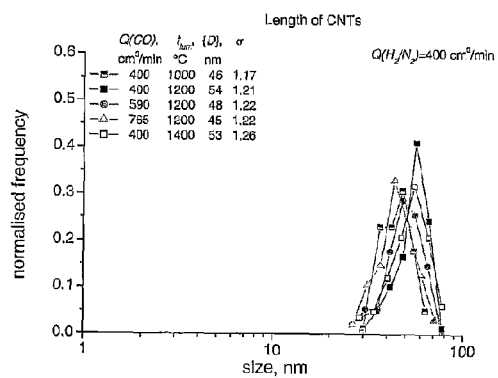
FIG. 10(a) shows number length distributions of CNTs produced at various conditions.
Figure 10B:
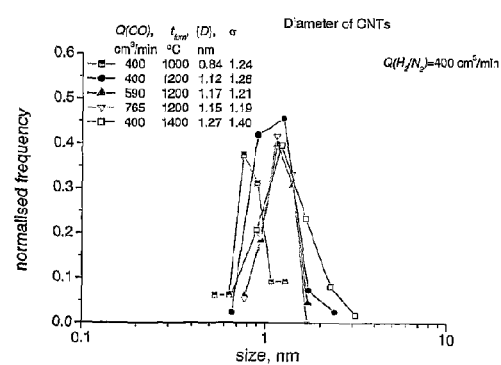
FIG. 10(b) shows number diameter distributions of CNTs produced at various conditions.

Number diameter and length distributions of the produced CNTs were obtained on the basis of high-resolution TEM images and presented in FIG. 10(a) and FIG. 10(b). The investigations of the influence of the experimental conditions on the CNT dimensions were carried out at a fixed hydrogen/nitrogen inner flow of 400 $cm^3$/min varying the furnace temperature from 1000 to 1200 to 1400° C. at a fixed outer CO flow rate of 400 $cm^3$/min and varying the outer CO flow rate from 400 to 590 to 765 $cm^3$/min at a fixed furnace temperature of 1200° C.

FIG. 10(a) shows number length distributions of the produced CNTs. The geometric mean length of CNTs varies from 46 to 54 nm (with the geometric standard deviation between 1.17 and 1.26) with the temperature increase in the system from 1000 to 1400° C. Increasing the CO flow rate from 400 to 765 $cm^3$/min (or decreasing the residence time) leads to a decrease in the length of CNTs from 54 to 45 nm (with the geometric standard deviation between 1.21 and 1.22).

FIG. 10(b) shows number diameter distributions of the produced CNTs. The geometric mean diameter of CNTs varies from 0.84 to 1.27 nm (with the geometric standard deviation between 1.24 and 1.40) with the temperature increase in the system from 1000 to 1400° C. Increasing the CO flow rate from 400 to 765 $cm^3$/min (or decreasing the residence time) leads to a decrease in the length of CNTs from 1.12 to 1.15 nm (with the geometric standard deviation between 1.28 and 1.19).

Figure 10C:
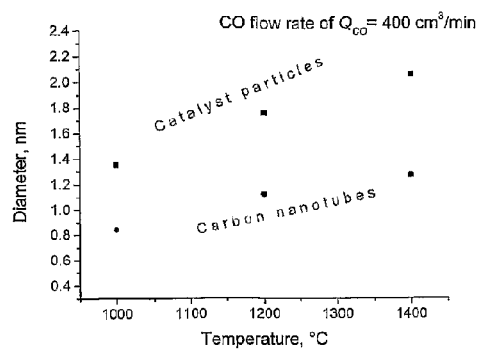
FIG. 10(c) shows the correlation between diameters of catalyst particles and produced CNTs.
Figure 10D:
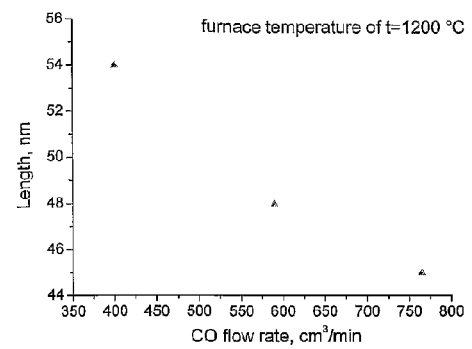
FIG. 10(d) shows the dependence of the length of produced CNTs on the CO flow rate.

FIG. 10(c) and FIG. 10(d) show the correlation between diameters of catalyst particles and produced CNTs at different temperatures and residence times (CO flow rates) in the reactor. It can be seen form FIG. 10(c) that the diameters of CNTs and catalyst particles initiated their growth are correlated and have similar temperature dependence. The length of CNTs can be controlled by the outer CO flow rate, which defines the residence time in the reactor (FIG. 10(d). As one can see the dimensions of CNTs such as diameters and lengths can be adjusted by varying the experimental conditions mainly temperature and residence time.

Example 3

Single Walled CNT Synthesis from Carbon Monoxide as Carbon Source Using Iron as Catalyst Material and Using a Stainless Steel Reactor Tube Reactor tube: stainless steel with a composition of Fe 53, Ni 20, Cr 25, Mn 1.6, Si, C 0.05 weight %.

Carbon source: CO.
Catalyst particle source: hot wire generator.
Catalyst material: iron wire of 0.25 mm in diameter.
Set furnace temperature: 900° C., corresponding to maximum furnace temperature of around $t_{max}$=1070° C.
Operating flow rates: CO outer flow of 400 $cm^3$/min and hydrogen/nitrogen (7/93) inner flow of 400 $cm^3$/min.

Figure 11:
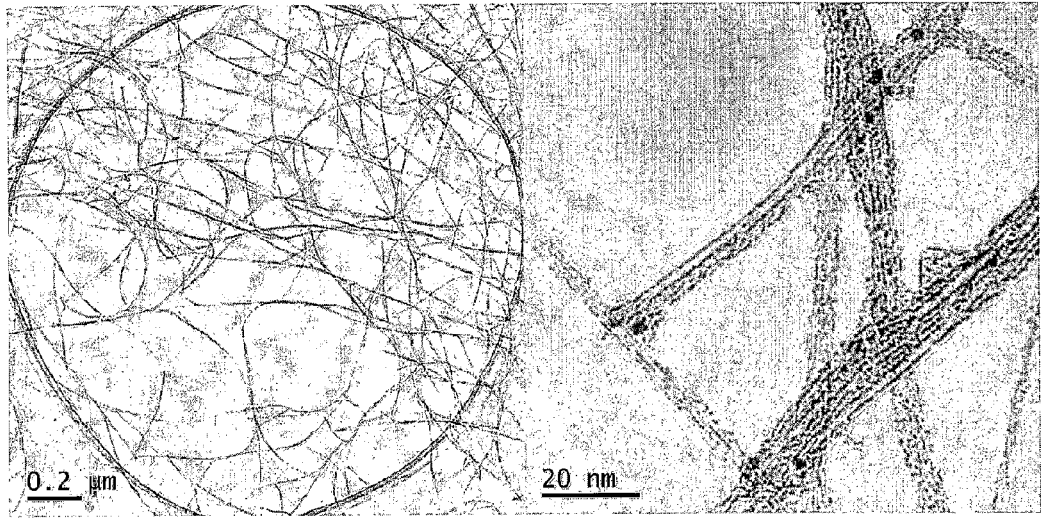
FIG. 11 shows TEM images of single walled CNTs synthesized inside a stainless steel tube at a set furnace temperature of 900° C. ($t_{max}$=1070° C.).

This example, illustrating the synthesis of single walled CNTs, was carried out in the embodiment of the invention shown in FIG. 3(b), wherein the reactor tube was made of stainless steel so as to provide saturated wall conditions for the iron vapor. FIG. 11 demonstrates the product formed at the given operating conditions. The product consists of bundles of single walled CNTs.

Example 4

Single Walled CNT Synthesis from Carbon Monoxide and Octanol/Thiophene Mixture as Carbon Sources and Reagents and Nickel as Catalyst Material and Using a Ceramic Reactor Tube Carbon source: CO, octanol and thiophene.
Reagent: thiophene (0.5 weight %) and octanol.
Catalyst particle source: hot wire generator.
Catalyst material: nickel wire of 0.25 mm in diameter.
Operating furnace temperature: 1200° C.
Operating flow rates: CO flow of 400 $cm^3$/min and hydrogen/nitrogen (7/93) flow of 400 $cm^3$/min.
Operating octanol and thiophene vapor pressure in the CNT reactor of 3.4 Pa and 30 Pa.

This example, illustrating the synthesis of single walled CNTs, was carried out in the embodiment of the invention shown in FIG. 3(a). A mixture of thiophene (0.5 weight %) and octanol was placed in a saturator (6) and was bubbled at room temperature with carbon monoxide, which was supplied from gas cylinder (1). A ceramic tube, with an internal diameter of 22 mm inserted inside the 40-cm length furnace (Entech, Sweden) was used as a CNT reactor. Pre-made catalyst particles were produced in a HWG separated in space from the CNT reactor. The HWG, which was a resistively heated thin nickel wire, was located inside a glass bulb. Nickel particles produced by HWG were carried into the CNT reactor with nitrogen/hydrogen (with mol component ratio of 93.0/7.0) form gas cylinder (2) shown in FIG. 3(a). In order to suppress the nickel particle evaporation inside the reactor, the walls of the reactor tube were saturated with nickel by blowing nickel acetylacetonate vapor through the heated up to about 700° C. reactor.

Figure 12:
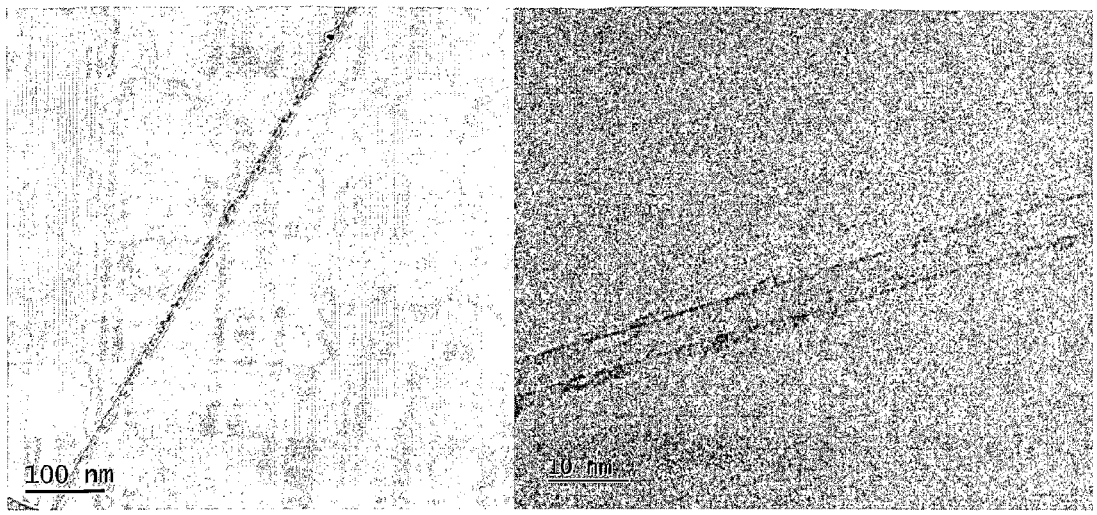
FIG. 12 shows TEM images of single walled CNTs synthesized at 1200° C. from carbon monoxide and ethanol/thiophene mixture as carbon sources and reagents using nickel as a catalyst material.

In the CNT reactor, the flow carrying the catalyst particles was mixed with the CO flow containing vapors of thiophene and octanol. Inside the CNT reactor, thiophene and octanol decomposition and CO disproportionation took place. It is worth noting that octanol vapor plays two important roles in the CNT reactor: it serves as a carbon source for CNT formation and as a reagent for CNT purification. Formed radicals and fragments containing oxygen after octanol decomposition can easily react with amorphous carbon deposited on the surface of forming CNTs and thus purifies them. Similarly, thiophene was utilized as carbon source and as a reagent. Thiophene supplies sulfur to the catalyst particles. One of the roles of sulfur in the processes of CNT formation is to lower the melting temperature of catalyst particles. FIG. 12 demonstrates the product formed at the given operating conditions. CNTs are single walled.

Example 5

Single Walled CNT Synthesis from Ethanol as Carbon Source and Reagent and Using Iron as Catalyst Material and Using a Ceramic Reactor Tube

Carbon source: ethanol.
Reagent: ethanol.
Catalyst particle source: hot wire generator.
Catalyst material: iron wire of 0.25 mm in diameter.
Operating furnace temperature: 1200° C.
Operating flow rates: hydrogen/nitrogen (7/93) inner flow of 400 cm$^3$/min and nitrogen outer flow of 400 cm$^3$/min.
Operating ethanol vapor pressure in the CNT reactor of 213 Pa.

This example, illustrating the synthesis of single walled CNTs, was carried out in the embodiment of the invention shown in FIG. 3(b). Ethanol was placed in a saturator (6) and was bubbled at room temperature with nitrogen, which was supplied from gas cylinder (1). The embodiment consisted of a HWG smoothly integrated with a heated vertical tubular CNT reactor. A ceramic tube, with an internal diameter of 22 mm inserted inside the 90-cm length furnace (Entech, Sweden) was used as a CNT reactor. Nitrogen was supplied from gas cylinder (1). The HWG, which was a resistively heated thin iron wire, was located inside the internal tube. The end of the HWG tube was placed at the location with the CNT reactor wall temperature of about 400° C. This temperature was found to be optimal, since reduced particle growth due to the agglomeration and coagulation, minimized particle diffusion losses on the walls and provided a reasonable iron vapor nucleation rate.

Figure 13:
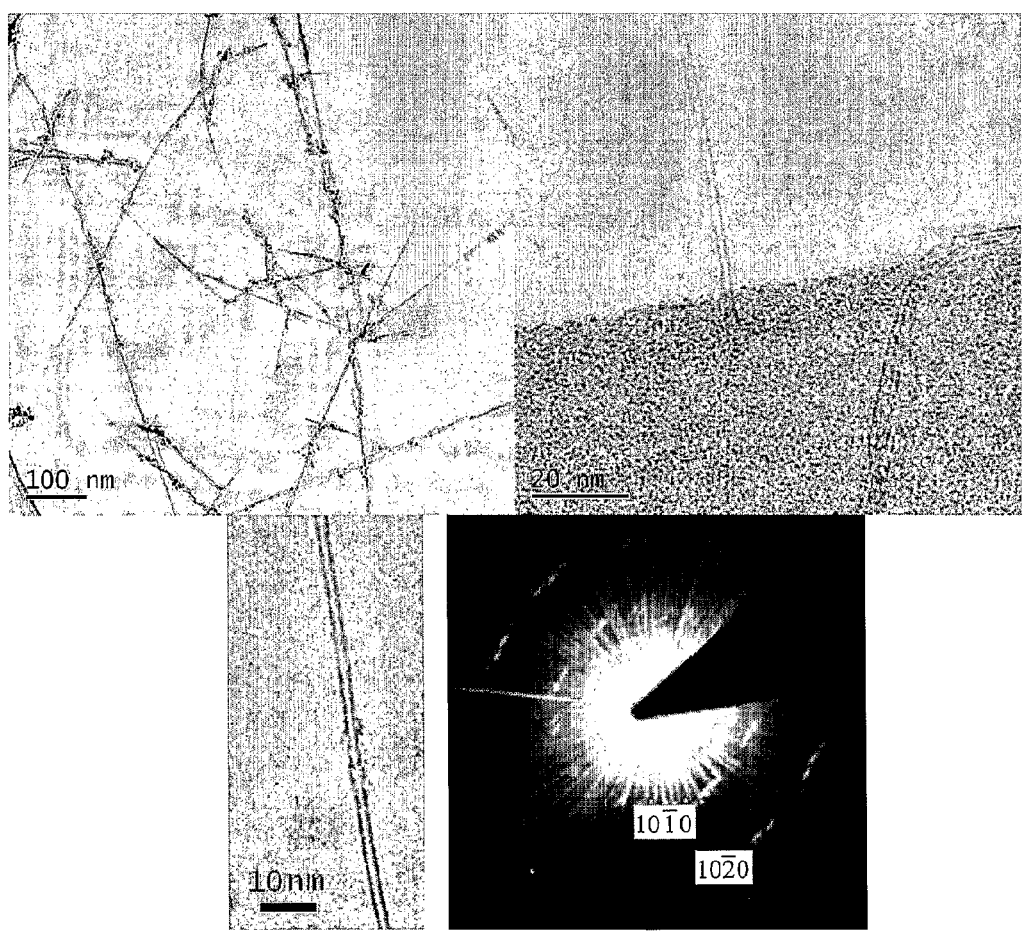
FIG. 13 shows TEM images of single walled CNTs synthesized at 1200° C. from ethanol as a carbon source and a reagent using iron as a catalyst material.

The metal particles produced by the HWG were carried into the CNT reactor with nitrogen/hydrogen (with mol component ratio of 93.0/7.0) from gas cylinder (2) shown in FIG. 3(b). In the CNT reactor, the flow of the metal particles from the HWG was mixed with outer nitrogen flow containing ethanol vapor. Inside the CNT reactor ethanol decomposition took place. It is worth noting that ethanol vapor plays two important roles in the CNT reactor: it serves as a carbon source for CNT formation and as a reagent for CNT purification. Formed radicals and fragments containing oxygen after ethanol decomposition can easily react with amorphous carbon deposited on the surface of forming CNTs and thus purifies them. FIG. 13 demonstrates single walled CNT product formed at the given operating conditions. One can see the surface of the produced CNTs does not contain amorphous carbon precipitation and is very clean. Also it is worth noting that virtually all catalyst particles initiated the growth of CNTs. FIG. 13 also shows a high-resolution TEM image and the corresponding electron diffraction pattern from a separated SWCNT of 1.6 nm in diameter. One can see from the electron diffraction pattern that the CNT is well crystalline. The radii of the inner and outer circles are consistent with the length of the diffraction vectors of graphite 10$\bar{1}$0, and 11$\bar{2}$0, respectively. Two sets of spots in the diffraction patterns showing that the CNT is a helical tube.

Example 6

Single Walled and Multi-Walled CNT Synthesis from Ethanol/Thiophene Mixture as Carbon Sources and Reagents and Using Iron as Catalyst Material and Using a Ceramic Reactor Tube

Carbon source: ethanol and thiophene.
Reagent: thiophene (0.5 weight %) and ethanol.
Catalyst particle source: hot wire generator.
Catalyst material: iron wire of 0.25 mm in diameter.
Operating furnace temperature: 1200° C.
Operating flow rates: nitrogen outer flow of 400 cm$^3$/min and inner flow hydrogen/nitrogen (7/93) of 400 cm$^3$/min.
Operating ethanol vapor pressure in the CNT reactor of 2950 Pa and 73 Pa.
Operating thiophene vapor pressure in the CNT reactor of 11 and 0.3 Pa.

Figure 14:
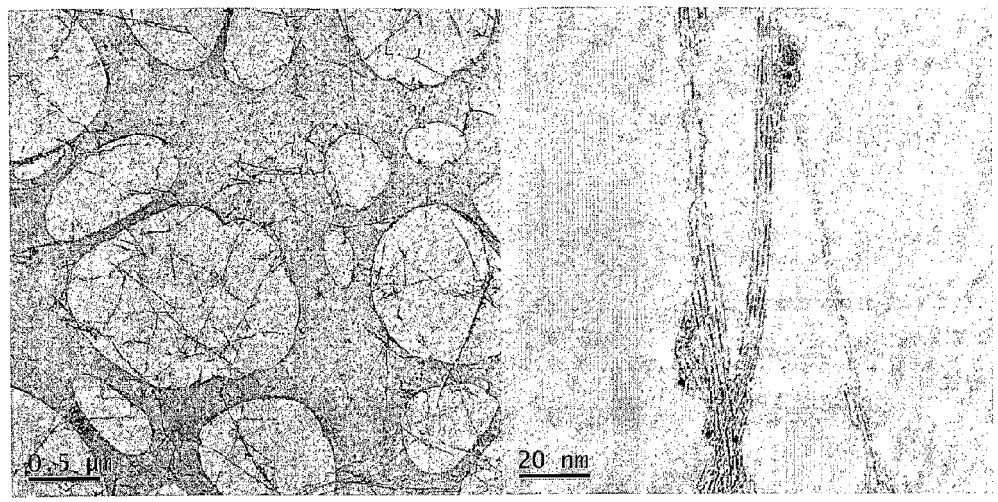
FIG. 14 shows TEM images of single walled CNTs synthesized at 1200° C. from ethanol/thiophene mixture as carbon sources and reagents using iron as a catalyst material.
Figure 15:
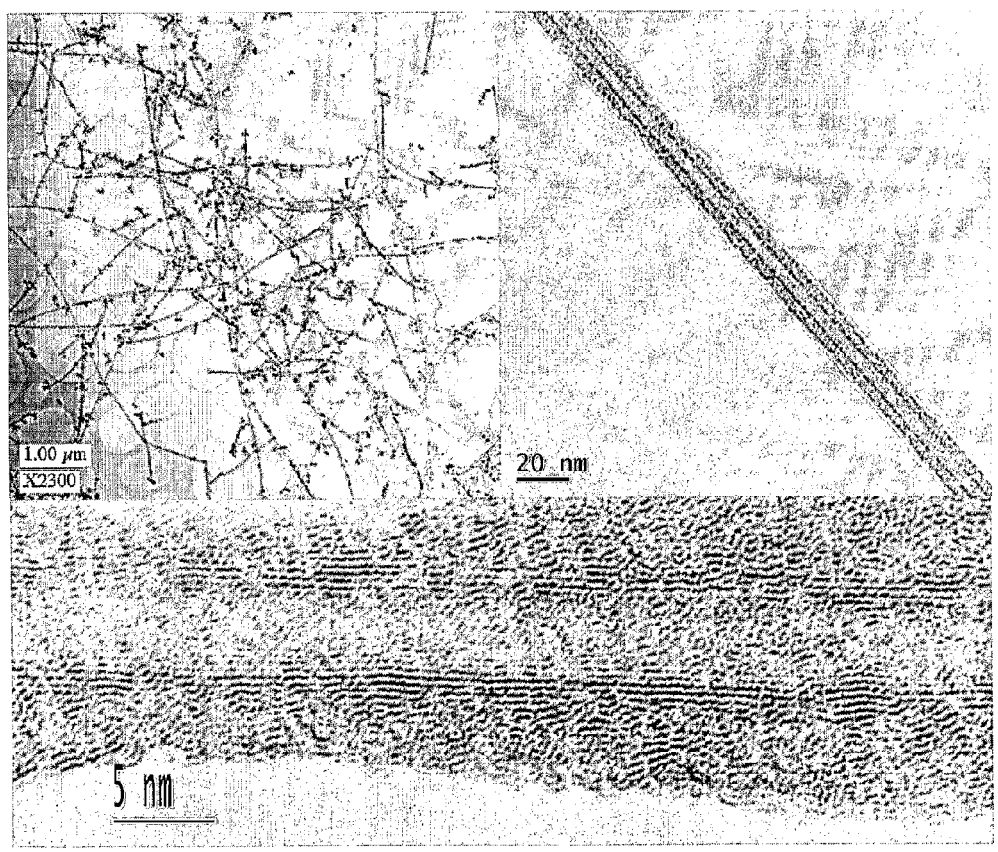
FIG. 15 shows TEM images of multi-walled CNTs synthesized at 1200° C. from ethanol/thiophene mixture as carbon sources and reagents using iron as a catalyst material.

This example illustrates the possibility to produce both single walled CNTs and multi-walled CNTs depending on the operating conditions, namely, on the vapor pressure of carbon sources (or amount of carbon in the system). A mixture of thiophene (0.5 weight %) and ethanol was placed in a saturator (6) and was bubbled at room temperature with a carrier gas with and without dilution of flow containing a carbon source. As a result two different ethanol/thiophene vapor pressures in the CNT reactor of 73/0.3 Pa and 2950/11 Pa were obtained. It is worth noting that the smallest operating concentration of carbon sources led to the formation of single walled CNTs, while higher concentration of the alcohol/thiophene mixture led to the production of multi-walled CNTs. FIG. 14 and FIG. 15 demonstrate the product formed at the given operating conditions and at different ethanol/thiophene vapor pressures. As can be seen from FIG. 14, single walled CNTs were produced at the smaller ethanol/thiophene vapor pressures of 73 and 0.28 Pa. Increasing the vapor pressure of the reagent and carbon source (up to 2950 and 11 Pa, respectively) led to the formation of multi-walled CNTs (see FIG. 15) and to the formation of amorphous carbon on the surface of the produced CNTs.

Example 7

Fullerene Functionalized Single Walled CNT Synthesis from CO as Carbon Source and Hydrogen Through a Hot Wire Generator and Using Iron as Catalyst Material and Using a Stainless Steel Reactor Tube

Reactor tube: stainless steel with a composition of Fe 53, Ni 20, Cr 25, Mn 1.6, Si, C 0.05 weight %.
Carbon source: CO.
Reagent: hydrogen through hot wire generator.
Catalyst particle source: hot wire generator.
Catalyst material: iron wire of 0.25 mm in diameter.
Operating furnace temperature: 900° C.
Operating flow rates: CO outer flow of 400 cm$^3$/min and inner flow hydrogen of 400 cm$^3$/min.

Figure 16:
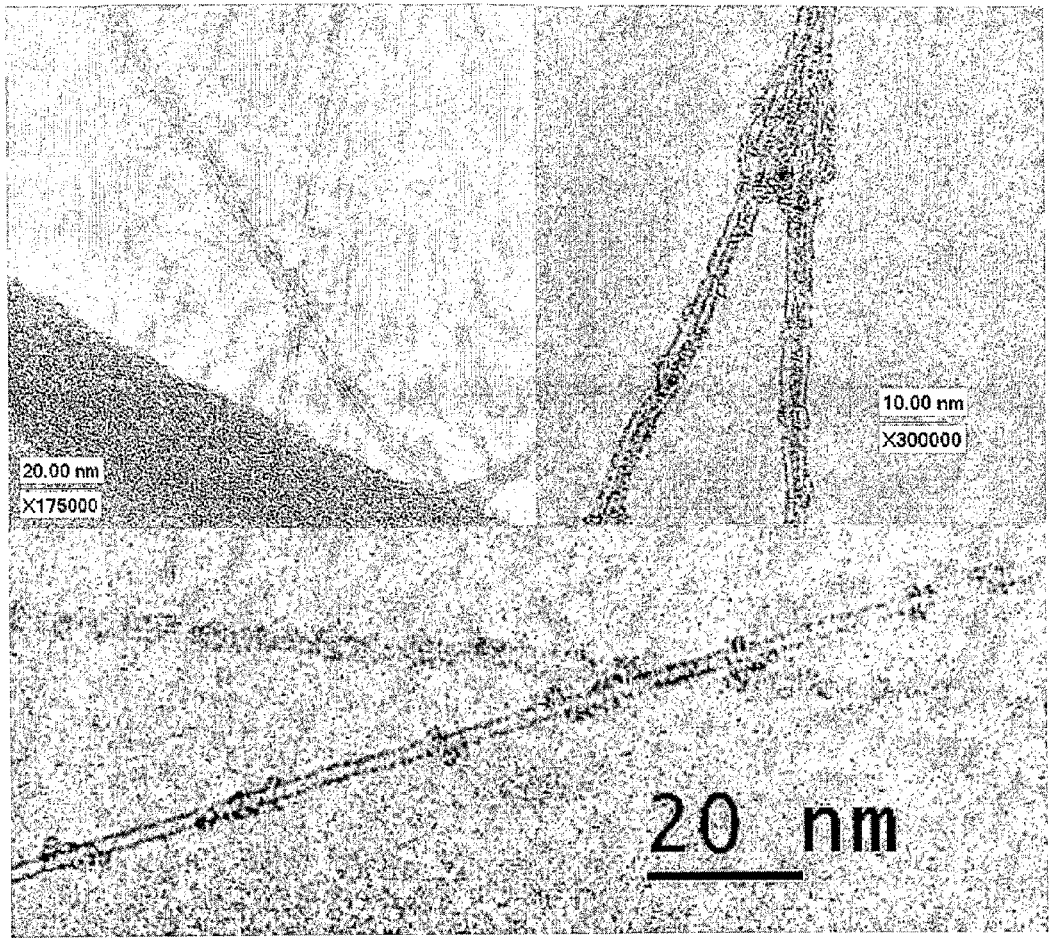
FIG. 16 shows TEM images of fullerene functionalized CNTs synthesized at 900° C. from CO as carbon source and pure hydrogen as a reagent flowing through the hot wire generator using iron as a catalyst material and using a stainless steel reactor tube.

This example, illustrating the synthesis of fullerene functionalized single walled CNTs, was carried out in the embodiment of the invention shown in FIG. 3(b), wherein the reactor tube was made of stainless steel and pure hydrogen was used through the hot wire generator. FIG. 16 demonstrates the product formed at the given operating conditions. The product consists of single walled CNTs functionalized fullerene molecules.

Example 8

Fullerene Functionalized Single Walled CNT Synthesis from CO as Carbon Source and Hydrogen Through Hot Wire Generator and Water Vapor as a Reagent and Using Iron as Catalyst Material and Using a Stainless Steel Reactor Tube

Reactor tube: stainless steel with a composition of Fe 53, Ni 20, Cr 25, Mn 1.6, Si, C 0.05 weight %.

Carbon source: CO.
Reagent: water vapor at 150 ppm.
Catalyst particle source: hot wire generator.
Catalyst material: iron wire of 0.25 mm in diameter.
Operating furnace temperature: 900° C.
Operating flow rates: CO outer flow of 400 cm$^3$/min and inner flow hydrogen/nitrogen (7/93) of 400 cm$^3$/min.

Figure 17:
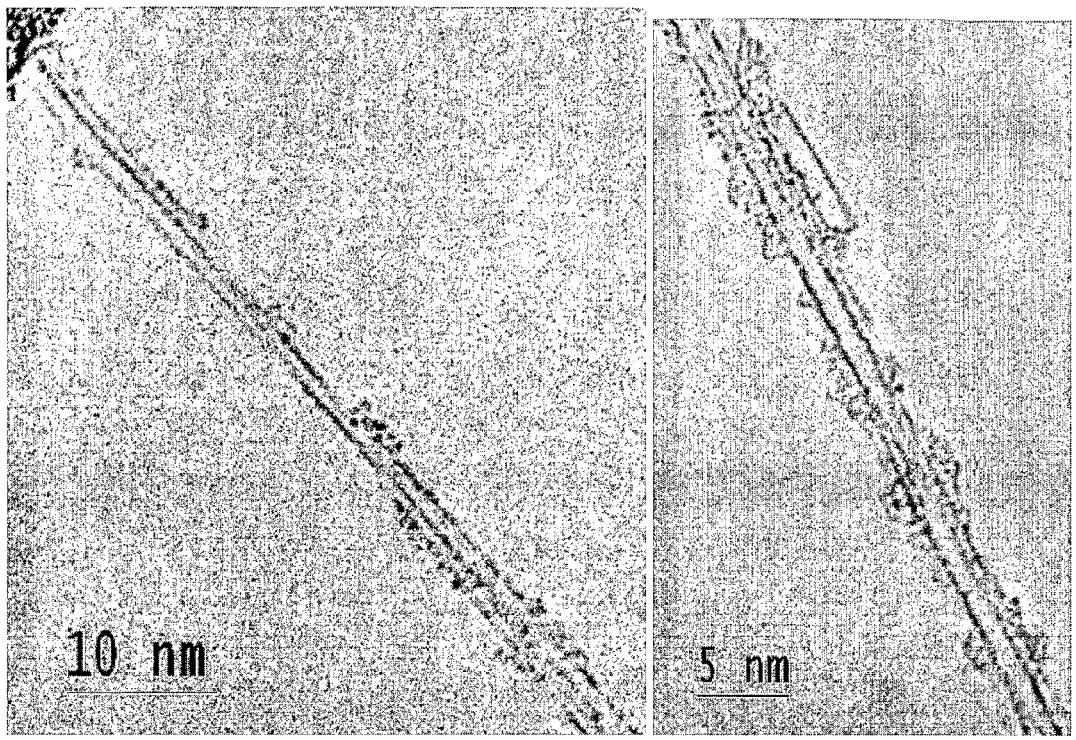
FIG. 17 shows TEM images of fullerene functionalized CNTs synthesized at 900° C. from CO as carbon source and water vapor as a reagent and using iron as a catalyst material and using a stainless steel reactor tube.

This example, illustrating the synthesis of fullerene functionalized single walled CNTs, was carried out in the embodiment of the invention shown in FIG. 3(b), wherein water vapor was used as a reagent and introduced via a saturator (6) and wherein the reactor tube was made of stainless steel. FIG. 17 demonstrates the product formed at the given operating conditions. The product consists of single walled CNTs functionalized fullerene molecules.

What is claimed is:

1. A method for producing carbon nanotubes from a gas phase, comprising:
    producing an aerosol of pre-made catalyst particles by physical vapor nucleation of catalyst material, the aerosol of pre-made catalyst particles being formed by nucleating supersaturated vapor;
    introducing said aerosol of pre-made catalyst particles into a reactor;
    introducing one or more carbon sources into the reactor; and
    reacting said pre-made catalyst particles and said one or more carbon sources in the reactor to produce carbon nanotubes.

2. The method according to claim 1, wherein the catalyst material contains one or more metals.

3. The method according to claim 1, wherein the supersaturated vapor is evaporated from one or more resistively heated wires consisting of one or more metals or metal alloys, due to metal or alloy arc, spark or electrostatic discharge, evaporating from a conductively heated metal or alloy or evaporating from radiatively heated metal or alloy.

4. The method according to claim 3, wherein the supersaturation is created by means of gas cooling by at least one of convective, conductive or radiative heat transfer or adiabatic expansion.

5. The method according to claim 1, wherein the aerosol of pre-made catalyst particles is produced before the production of carbon nanotubes in the reactor.

6. The method according to claim 1, wherein the catalyst particles are classified according to one or more particle properties.

7. The method according to claim 6, wherein the catalyst particles are at least one of mobility-size classified, mass classified, solubility classified, reactivity classified, inertially classified, thermophoretically classified, diffusionally classified, charge classified, crystallinity classified or gravitationally classified.

8. The method according to claim 6, wherein the catalyst particles are classified by a differential mobility analyzer or by a mass spectrometer.

9. The method according to claim 1, wherein the carbon source comprises a hydrocarbon.

10. The method according to claim 1, wherein the carbon source comprises at least one selected from the group consisting of methane, ethane, propane, acetylene, ethylene, benzene, toluene, o-xylene, p-xylene, 1,2,4-trimethylbenzene, 1,2,3-trimethylbenzene, $C_{15}H_{32}$, $C_{16}H_{34}$, $C_{17}H_{36}$, $C_{18}H_{38}$, methanol, ethanol, propanol, butanol, pentanol, hexanol, heptanol, octanol, acetone, methyl ethyl ketone, formic acid, acetic acid and carbon monoxide.

11. The method according to claim 1, wherein the method further comprises using one or more reagents.

12. The method according to claim 11, wherein the reagent(s) is/are used for participation in a chemical reaction with one or more catalyst particle precursors, one or more catalyst particles, one or more carbon sources, amorphous carbon deposited on carbon nanotubes or carbon nanotubes.

13. The method according to claim 11, wherein the chemical reaction of the one or more reagents with the pre-made particles is used for promotion of carbon nanotube formation, the chemical reaction of the one or more reagents with amorphous carbon is used for carbon nanotube purification, and the chemical reaction of the one or more reagents with the carbon nanotubes is used for at least one of carbon nanotube functionalization or carbon nanotube doping.

14. The method according to claim 11, wherein the one or more reagents are selected from the group consisting of alcohol, $H_2$, $H_2O$, NO, $CO_2$, $PH_3$ and $NH_3$.

15. The method according to claim 1, wherein the method further comprises the following step:
    using one or more additives to produce a composite carbon nanotube formulation.

16. The method according to claim 1, wherein at least one of residence time, temperature, catalyst particle properties, catalyst particle concentration, reagent concentration, or carbon source concentration histories in one or more reactors are controlled.

17. The method according to claim 1, wherein there are two or more existing catalyst particle supplies which are composed of particles of essentially similar sizes, compositions, concentrations, states or morphologies or are composed of two or more distinct sizes, compositions, concentrations, states or morphologies.

18. An apparatus for producing carbon nanotubes from a gas phase, comprising:
    a device configured to produce an aerosol of pre-made catalyst particles by physical vapor nucleation of catalyst material, the aerosol of pre-made catalyst particles being formed by nucleating supersaturated vapor, said device comprising a hot wire generator; and
    one or more reactors for producing carbon nanotubes using said aerosol of pre-made catalyst particles and one or more carbon sources, the one or more reactors being configured for the introduction of the aerosol of pre-made catalyst particles, the introduction of the one or more carbon sources, and reacting the pre-made catalyst particles and the one or more carbons sources to produce the carbon nanotubes.

19. The apparatus according to claim 18, wherein the apparatus further comprises one or more of the following:
    one or more catalyst particle classifiers;
    one or more carbon nanotube samplers;
    one or more carbon nanotube classifiers;
    one or more sources supplying energy to said device configured to produce said aerosol of pre-made catalyst particles or to said reactor;
    one or more devices configured for introducing one or more reagents or additives to the device configured to produce said aerosol of pre-made catalyst particles or to the reactor;
    one or more aerosol samplers or classifiers extracting all or part of the carbon nanotube aerosol flow;
    one or more aerosol samplers or classifiers extracting all or part of a composite carbon nanotube aerosol flow.

20. The apparatus according to claim 18, wherein a surface of at least one of the reactor or the device configured to produce said aerosol of pre-made catalyst particles contain material included in one or more catalyst particles or in that the surfaces of the reactor or the device configured to produce said aerosol of pre-made catalyst particles are saturated with material included in one or more catalyst particles.

21. An apparatus for producing carbon nanotubes from a gas phase, comprising:
   a device configured to produce an aerosol of pre-made catalyst particles by physical vapor nucleation of catalyst material, the aerosol of pre-made catalyst particles being formed by nucleating supersaturated vapor; and
   one or more reactors for producing carbon nanotubes using said aerosol of pre-made catalyst particles and one or more carbon sources, the one or more reactors being configured for the introduction of the aerosol of pre-made catalyst particles, the introduction of the one or more carbon sources, and reacting the pre-made catalyst particles and the one or more carbons sources to produce the carbon nanotubes,
   wherein there are two or more pre-reactors and said pre-reactors are operated in parallel and said parallel pre-reactors are operated at essentially similar conditions or with essentially similar materials so as to produce catalyst particles of essentially similar sizes, compositions, concentrations, states or morphologies or said parallel pre-reactors are operated at different conditions or with different materials or methods so as to produce catalyst particles of two or more distinct sizes, compositions, concentrations, states or morphologies.

22. The apparatus according to claim 18, wherein said reactors are operated in parallel and said parallel reactors are operated at essentially similar conditions or with essentially similar materials so as to produce carbon nanotubes with essentially similar length, diameter, morphology or chirality or said parallel reactors are operated at different conditions or with different materials or methods so as to produce carbon nanotubes with two or more distinct lengths, diameters, morphologies or chiralities.

23. The apparatus according to claim 18, wherein at least one of reactor length, volume wall temperature or flow rate of carbon sources, reagents or carrier gases are configured to control at least one of residence time, or temperature history of catalyst particles, carbon nanotubes or composite carbon nanotubes in the reactor(s) or pre-reactor(s).

* * * * *